US012717312B2

(12) United States Patent
Furokawa et al.

(10) Patent No.: US 12,717,312 B2
(45) Date of Patent: Aug. 25, 2026

(54) INFORMATION PROCESSING METHOD, INFORMATION PROCESSING APPARATUS, MOLDING MACHINE SYSTEM AND NON-TRANSITORY COMPUTER READABLE RECORDING MEDIUM

(71) Applicant: The Japan Steel Works, Ltd., Tokyo (JP)

(72) Inventors: Mikio Furokawa, Tokyo (JP); Jun Suzuki, Tokyo (JP); Takayuki Hirano, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 310 days.

(21) Appl. No.: 18/277,551

(22) PCT Filed: Feb. 17, 2022

(86) PCT No.: PCT/JP2022/006321

§ 371 (c)(1),
(2) Date: Aug. 16, 2023

(87) PCT Pub. No.: WO2022/176937

PCT Pub. Date: Aug. 25, 2022

(65) Prior Publication Data

US 2024/0126244 A1 Apr. 18, 2024

(30) Foreign Application Priority Data

Feb. 22, 2021 (JP) ................................ 2021-026384

(51) Int. Cl.
*G05B 19/418* (2006.01)
*G06Q 50/04* (2012.01)

(52) U.S. Cl.
CPC ......... *G05B 19/4184* (2013.01); *G06Q 50/04* (2013.01)

(58) Field of Classification Search
None
See application file for complete search history.

(56) References Cited

U.S. PATENT DOCUMENTS

2005/0278053 A1* 12/2005 Chia .................. G05B 23/0227 700/110
2007/0021999 A1 1/2007 Whalen et al.
(Continued)

FOREIGN PATENT DOCUMENTS

CN 109612037 A 4/2019
CN 111433691 A 7/2020
(Continued)

OTHER PUBLICATIONS

English Translation of International Search Report for PCT Application No. PCT/JP2022/006321 mailed May 24, 2022, 2 pages.
(Continued)

*Primary Examiner* — David Earl Ogg
(74) *Attorney, Agent, or Firm* — Christian S. Hans; Bret E. Field; Bozicevic, Field & Francis LLP

(57) ABSTRACT

An information processing method for detecting conditions of a plurality of manufacturing devices respectively used by a plurality of entities includes acquiring sensor value data obtained by detecting physical quantities related to the manufacturing devices; individually storing collected sensor value data in a plurality of databases; generating by machine learning a plurality of learning models based on the stored sensor value data; and calculating a condition of the manufacturing device of one of the entities by inputting sensor value data acquired from the manufacturing device of the one of the entities to the one or more of the learning models selected by the one of the entities.

18 Claims, 30 Drawing Sheets

(56) References Cited

U.S. PATENT DOCUMENTS

| | | | | |
|---|---|---|---|---|
| 2014/0279795 | A1* | 9/2014 | Shibuya | G05B 23/0221 706/46 |
| 2018/0011626 | A1* | 1/2018 | Kelley | G06Q 10/0639 |
| 2018/0349757 | A1 | 12/2018 | Ando | |
| 2019/0101305 | A1 | 4/2019 | Hada et al. | |
| 2019/0101897 | A1 | 4/2019 | Iijima et al. | |
| 2020/0130246 | A1* | 4/2020 | Horiuchi | G06N 3/09 |
| 2020/0151593 | A1 | 5/2020 | Horiuchi | |
| 2020/0254670 | A1* | 8/2020 | Horiuchi | G06N 3/08 |
| 2020/0278646 | A1 | 9/2020 | Sakiyama et al. | |
| 2020/0326684 | A1 | 10/2020 | Chand et al. | |
| 2020/0327371 | A1 | 10/2020 | Sharma et al. | |
| 2020/0380362 | A1 | 12/2020 | Cao et al. | |

FOREIGN PATENT DOCUMENTS

| | | | |
|---|---|---|---|
| CN | 111835628 | A | 10/2020 |
| JP | 2018-049400 | A | 3/2018 |
| JP | 2019-139734 | A | 8/2019 |
| JP | 2020-62848 | A | 4/2020 |
| JP | 2020-66178 | A | 4/2020 |
| JP | 2020-80054 | A | 5/2020 |
| TW | 201939365 | A | 10/2019 |
| TW | 202040441 | A | 11/2020 |
| WO | WO2017159614 | A1 | 9/2017 |
| WO | WO2020207893 | A1 | 10/2020 |

OTHER PUBLICATIONS

Extended European Search Report for European Application No. 22756255.0 mailed Jan. 29, 2025, 8 pages.

Office Action for Taiwan Application No. 111105981 mailed Aug. 22, 2025, with its machine translation,.

Chinese Office Action mailed Apr. 8, 2026, for Chinese Patent Application No. 202280016208.5, and its machine translation, 20 pages.

* cited by examiner

Information Processing Apparatus
2
Cloud
Router
7
8
Edge Computer
6
Entity A1
1
5
10
11
12
13
14

Edge Computer
6
Sensor
5
Input Unit
64
Arithmetic Unit
61
Storage Unit
62
Communication Unit
63
Router
7
Cloud
Information Proccssing Apparatus
2
Control Device
14

Information Processing Apparatus
2
23
21
22
Storage Unit
P
20
Computer Program
Entity Information DB
22a
Machine Information DB
22b
Individual DB Group
3
AI Model Group
4
Communication Unit (acquisition Unit)
Processing Unit
Edge Computer
6
8

FIG.6

Entity information DB

22a

| Entity ID | Authentication information | Affiliated entity ID | Model selection information |
| --- | --- | --- | --- |

FIG.7

Machine information DB

22b

| Machine ID | Entity ID | Plant ID | Edge ID |
| --- | --- | --- | --- |

FIG.9

| | Entity A1 | Entity A2 | Entity A3 | ··· |
|---|---|---|---|---|
| AI for detecting abnormal vibrations of speed reducer | ✓ | | ✓ | ··· |
| AI for detecting wear and the like of screw | ✓ | ✓ | ✓ | ··· |
| AI for detecting performance degradation of speed reducer | ✓ | ✓ | ✓ | ··· |
| AI for detecting failed part of speed reducer | ✓ | | ✓ | ··· |
| AI for detecting inefficient operating condition | ✓ | | | ··· |
| AI for detecting an abnormal operating condition | ✓ | ✓ | | ··· |
| ··· | ··· | ··· | ··· | ··· |

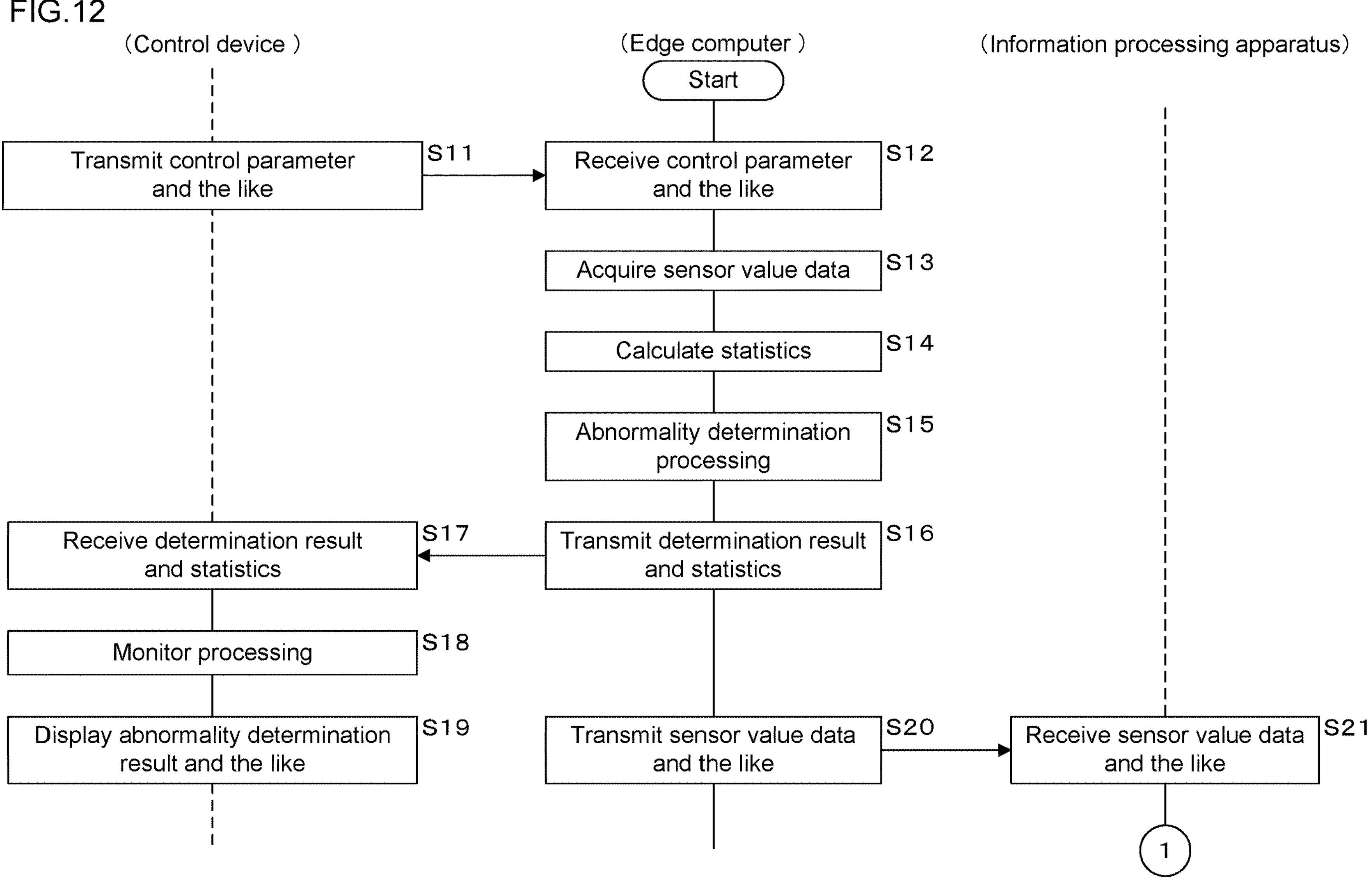
FIG.12
(Control device)
(Edge computer)
(Information processing apparatus)
Start
S11
Transmit control parameter and the like
S12
Receive control parameter and the like
S13
Acquire sensor value data
S14
Calculate statistics
S15
Abnormality determination processing
S16
Transmit determination result and statistics
S17
Receive determination result and statistics
S18
Monitor processing
S19
Display abnormality determination result and the like
S20
Transmit sensor value data and the like
S21
Receive sensor value data and the like
1

(Control device )
(Edge computer )
(Information processing apparatus)
Start
1
Store sensor value data and the like
S22
Select learning model
S23
Detect condition
S24
Receive detection result
S26
Transmit detection result
S25
Receive detection result
S28
Transmit detection result
S27
Display determination result
S29
Generate or update learning models
S30

Unit of Affiliated Entity Group
Information Proccssing Apparatus
2
Unit of Entity
Unit of Plant
Plant of Entity A
Unit of Edge Computer
Edge
6
1
Molding Machine
Plant of entity A
Plant of Subsidiary Entity of Entity A

FIG.16

Model selection information

| | AI for detecting abnormal vibrations of speed reducer | AI for detecting wear and the like of screw | AI for detecting performance degradation of speed reducer | AI for detecting failed part of speed reducer | AI for detecting inefficient operating condition | AI for detecting an abnormal operating condition | ... |
|---|---|---|---|---|---|---|---|
| Using first general-Purpose learning model | ✓ | | | | | | ... |
| Using second general-Purpose learning model without fine tuning | | ✓ | | | | | ... |
| Affiliated entity shared AI fine-tuned | | | ✓ | | | | ... |
| Fine-tuned AI on entity basis | | | | ✓ | ✓ | | ... |
| Fine-tuned AI on plant basis | | | | ✓ | ✓ | | ... |
| Fine-tuned AI on edge computer basis | | | | ✓ | | | ... |
| Fine-tuned AI on machine basis | | | | ✓ | | | ... |
| Fine-tuned AI on a process basis | | | | | | ✓ | ... |

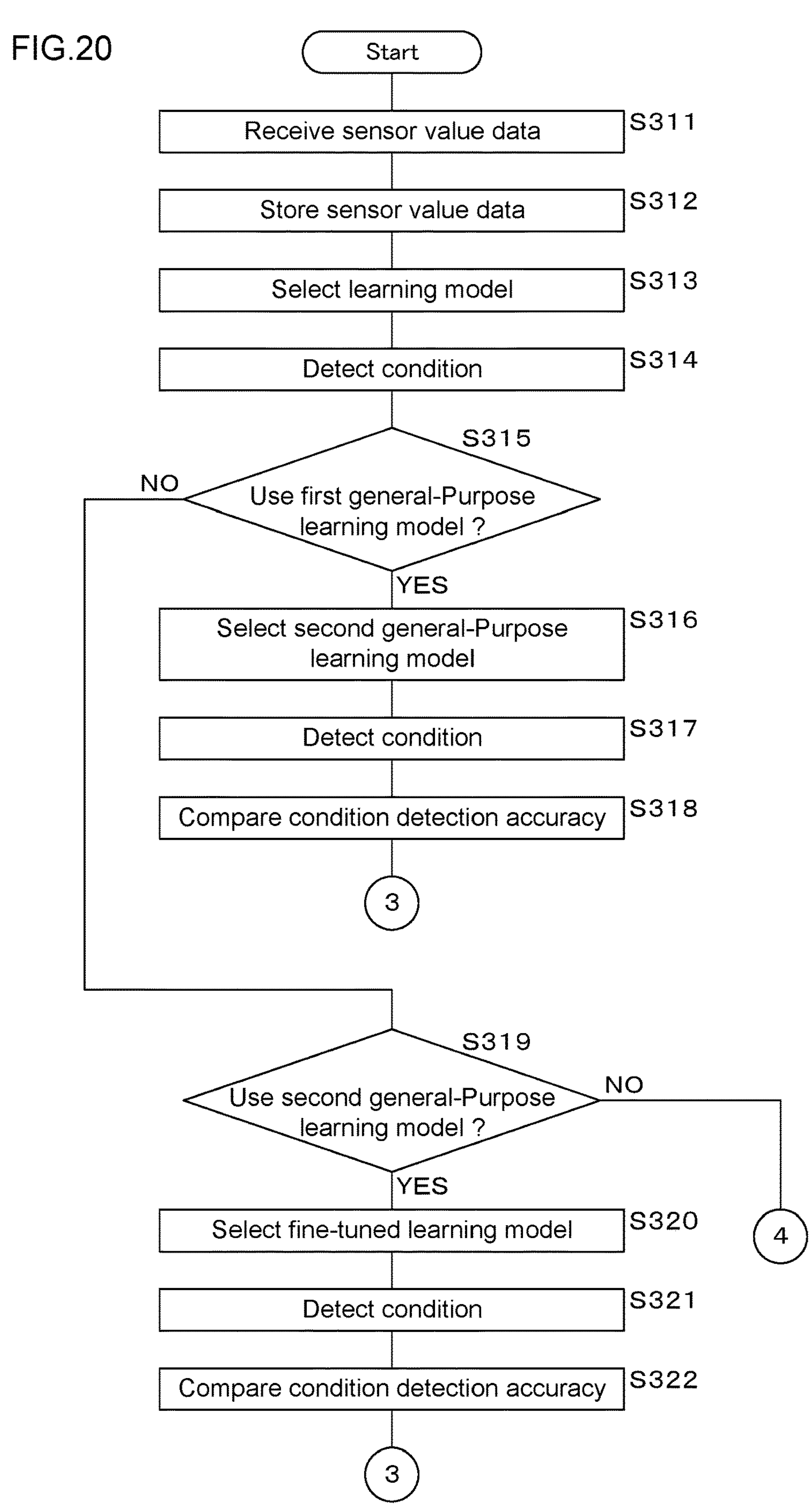
FIG.20
Start
Receive sensor value data
S311
Store sensor value data
S312
Select learning model
S313
Detect condition
S314
S315
Use first general-Purpose learning model ?
NO
YES
Select second general-Purpose learning model
S316
Detect condition
S317
Compare condition detection accuracy
S318
3
S319
Use second general-Purpose learning model ?
NO
YES
Select fine-tuned learning model
S320
4
Detect condition
S321
Compare condition detection accuracy
S322
3

FIG.22

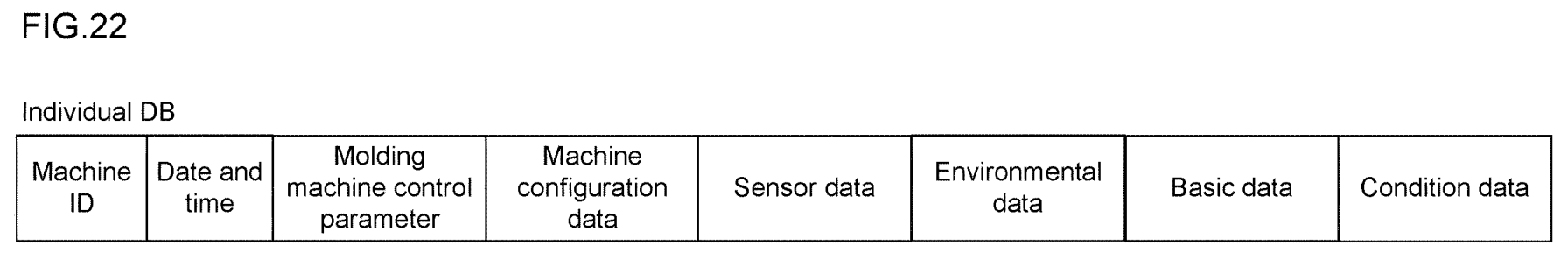

Individual DB

| Machine ID | Date and time | Molding machine control parameter | Machine configuration data | Sensor data | Environmental data | Basic data | Condition data |
| --- | --- | --- | --- | --- | --- | --- | --- |

INFORMATION PROCESSING METHOD, INFORMATION PROCESSING APPARATUS, MOLDING MACHINE SYSTEM AND NON-TRANSITORY COMPUTER READABLE RECORDING MEDIUM

CROSS-REFERENCE TO RELATED APPLICATIONS

This application is the national phase under 35 U.S.C. § 371 of PCT International Application No. PCT/JP2022/006321 which has an International filing date of Feb. 17, 2022 and designated the United States of America.

BACKGROUND ART

The present disclosure relates to an information processing method, an information processing apparatus, a molding machine system and a computer program.

Japanese Patent Application Laid-Open No. 2020-66178 discloses a condition judgment device that acquires data related to an injection molding machine and presumes an abnormality of the injection molding machine using a learning model. The condition judgment device of Japanese Patent Application Laid-Open No. 2020-66178 stores multiple learning models, and classifies the acquired data related to the injection molding machine and inputs the classified data to the corresponding learning model to thereby efficiently and accurately presume an abnormality of the injection molding machine. For example, the condition judgment device classifies data for each step of the injection molding and presumes an abnormality in each step.

DESCRIPTION

An object of the present disclosure is to provide an information processing method, an information processing apparatus, a molding machine system and a computer program that are able to prepare a wide variety of learning models capable of highly accurate condition detection by collecting sensor value data of the manufacturing devices from multiple entities, and able to appropriately select and use an optimum learning model or a learning model required by an individual entity which uses an information processing apparatus.

The condition judgment device disclosed in Patent Document 1 merely stores learning models respectively corresponding to multiple steps and is not configured to allow the user to select and use a desired learning model from the prepared wide variety of learning models. In addition, there is no disclosure of a mechanism for collecting sufficient sensor value data necessary to generate or update a wide variety of learning models that is excellent in the condition detection accuracy of the manufacturing device.

An information processing method according to the present disclosure is an information processing method for detecting conditions of a plurality of manufacturing devices respectively used by a plurality of entities, and comprises: acquiring sensor value data obtained by detecting physical quantities related to the plurality of manufacturing devices respectively used by the plurality of entities; individually storing sensor value data acquired from the plurality of manufacturing devices in a plurality of databases prepared respectively for the entities that use the manufacturing devices; generating or updating by machine learning a plurality of learning models for detecting conditions of the manufacturing devices based on sensor value data stored in the plurality of databases; storing identifying information of the entities in association with model selection information indicating one or more of the plurality of learning models selected by the entities; and calculating a condition of the manufacturing device of one of the entities by inputting sensor value data acquired from the manufacturing device of the one of the entities to the one or more of the learning models indicated by the model selection information associated with the identifying information of the one of the entities.

An information processing apparatus according to the present disclosure is an information processing apparatus for detecting conditions of a plurality of manufacturing devices respectively used by a plurality of entities, and comprises: an acquisition unit that acquires sensor value data obtained by detecting physical quantities related to the plurality of manufacturing devices respectively used by the plurality of entities; a plurality of databases that individually store sensor value data acquired from the plurality of manufacturing devices for each of the entities that use the manufacturing devices; and a processing unit, the processing unit generating or updating by machine learning a plurality of learning models for detecting conditions of the manufacturing devices based on sensor value data stored in the plurality of databases, storing identifying information of the entities in association with model selection information indicating one or more of the plurality of learning models selected by the entities, and calculating a condition of the manufacturing device of one of the entities by inputting sensor value data acquired from the manufacturing device of the one of the entities to the one or more of the learning models indicated by the model selection information associated with the identifying information of the one of the entities.

A molding machine system according to the present disclosure comprises: the information processing apparatus; and a molding machine, and the information processing apparatus is configured to detect a condition of the molding machine.

A computer program according to the present disclosure causing a computer to execute processing of detecting a condition of a plurality of manufacturing devices respectively used by a plurality of entities, and comprises: acquiring sensor value data obtained by detecting physical quantities related to the plurality of manufacturing devices respectively used by the plurality of entities; individually storing sensor value data acquired from the plurality of manufacturing devices in a plurality of databases prepared respectively for the entities that use the manufacturing devices; generating or updating by machine learning a plurality of learning models for detecting conditions of the manufacturing devices based on sensor value data stored in the plurality of databases; storing identifying information of the entities in association with model selection information indicating one or more of the plurality of learning models selected by the entities; and calculating a condition of the manufacturing device of one of the entities by inputting sensor value data acquired from the manufacturing device of the one of the entities to the one or more of the learning models indicated by the model selection information associated with the identifying information of the one of the entities.

According to the present disclosure, it is possible to prepare a wide variety of learning models capable of highly accurate condition detection by collecting sensor value data of the manufacturing devices from multiple entities, and appropriately select and use an optimum learning model or a learning model required by an individual entity which uses an information processing apparatus.

The above and further objects and features will more fully be apparent from the following detailed description with accompanying drawings.

FIG. 6 is a conceptual diagram presenting an example of a record layout of an entity information DB according to the first embodiment.

FIG. 7 is a conceptual diagram presenting an example of a record layout of a device information DB according to the first embodiment.

FIG. 9 is a conceptual diagram presenting an example of model selection information.

FIG. 12 is a flowchart illustrating a processing procedure related to condition detection of the molding machine according to the first embodiment.

FIG. 16 is a conceptual diagram presenting one example of model selection information according to the second embodiment.

FIG. 20 is a flowchart illustrating a processing procedure for proposing an optimum learning model according to a third embodiment.

FIG. 22 is a conceptual diagram illustrating an individual DB according to a fourth embodiment.

Specific examples of an information processing method, an information processing apparatus, a molding machine system and a computer program according to embodiments of the present disclosure will be described below with reference to the drawings. It should be noted that the invention is not limited to these examples, and is indicated by the scope of claims, and is intended to include all modifications within the meaning and scope equivalent to the scope of claims. Furthermore, at least parts of the following embodiment and modifications may arbitrarily be combined.

Figure 1:
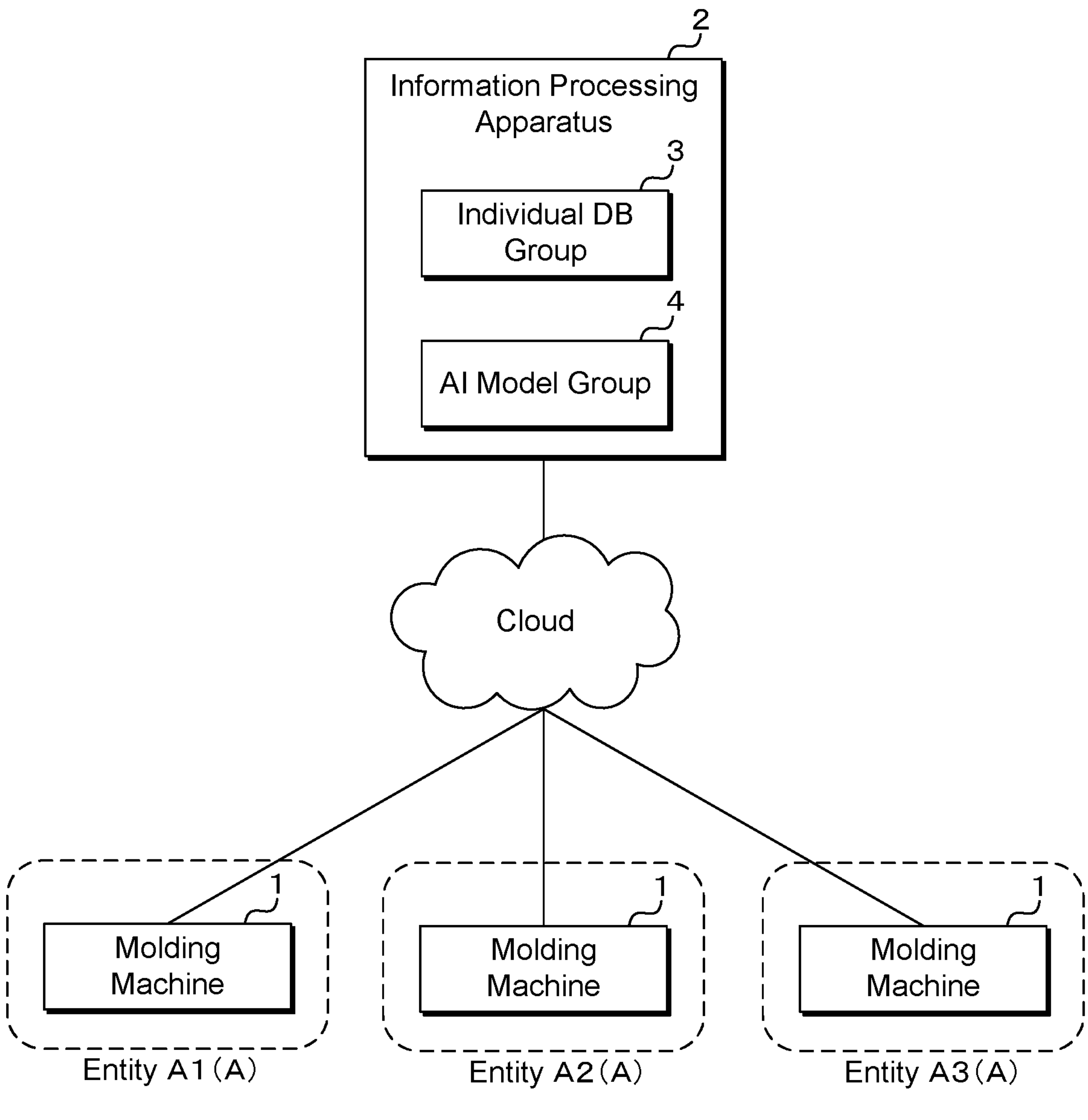
FIG. 1 is a block diagram illustrating the entire configuration of a molding machine system according to a first embodiment.
Figure 2:
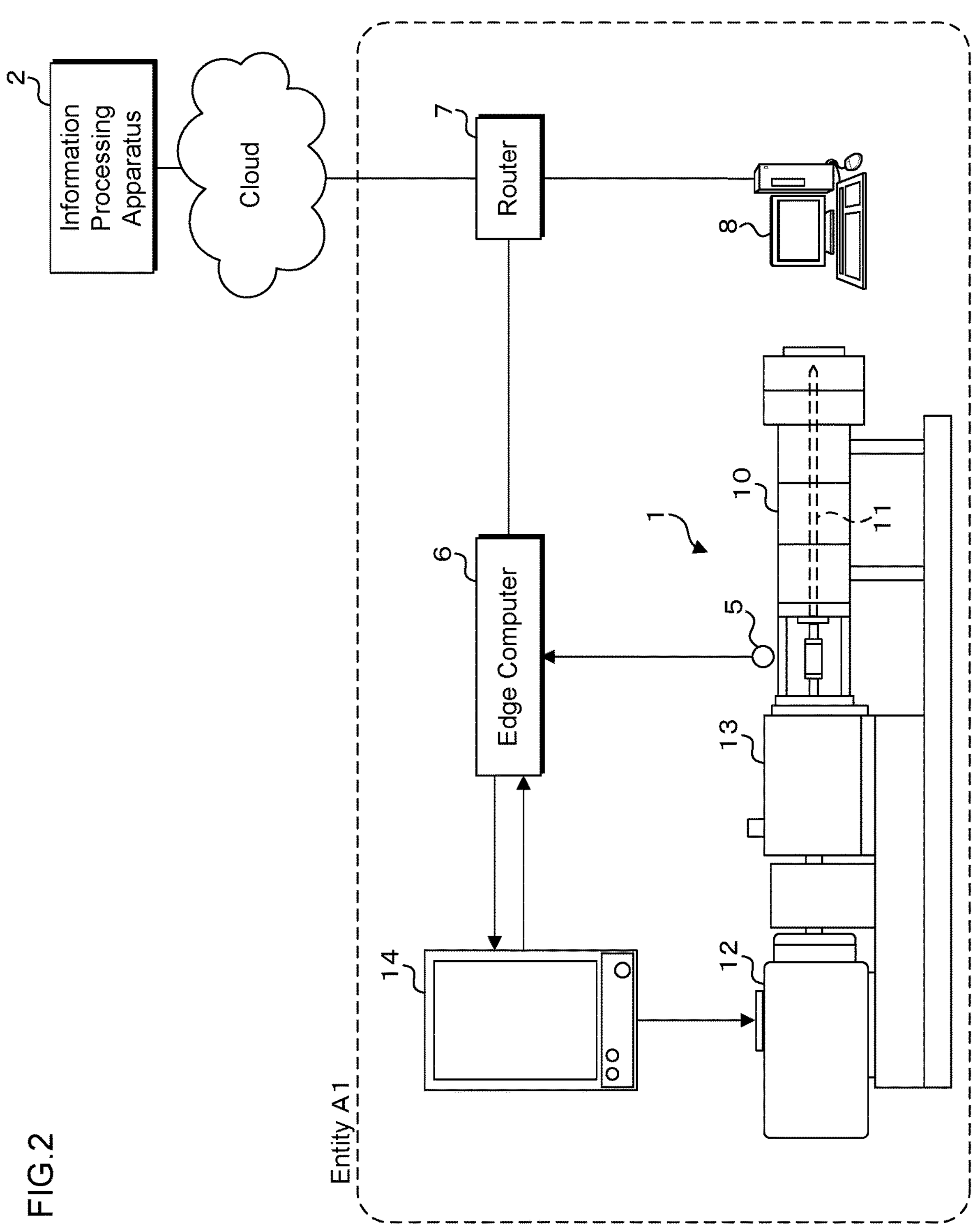
FIG. 2 is a block diagram illustrating an example of the detailed configuration of the molding machine system according to the first embodiment.

FIG. 1 is a block diagram illustrating the entire configuration of a molding machine system according to a first embodiment, and FIG. 2 is a block diagram illustrating the detailed configuration of the molding machine system according to the first embodiment. As illustrated in FIG. 1, the molding machine system includes multiple molding machines 1 respectively used by multiple entities A1, A2, A3 . . . (hereinafter appropriately referred to as "entity A") and an information processing apparatus 2 detecting conditions of the multiple molding machines 1. As illustrated in FIG. 2, the molding machine system includes a sensor 5 installed in the molding machine 1 used by each entity A, an edge computer 6, a router 7 and a terminal device 8 of the entity A, which is the user. Though each entity A has one or more molding machines 1, but for simplicity of explanation, the first embodiment describes each entity A as having one molding machine 1. The information processing apparatus 2 constitutes a cloud computer and has an individual DB group 3 consisting of multiple individual databases 31 (see FIG. 6) respectively prepared for the entities A that use the molding machines 1, and an AI model group 4 consisting of multiple learning models for detecting multiple types of conditions of the molding machines 1.

Figure 3:
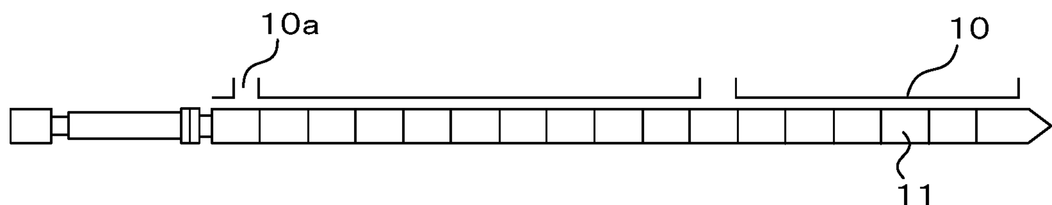
FIG. 3 is a schematic view illustrating an example of the configuration of a molding machine according to the first embodiment.

FIG. 3 is a schematic view illustrating an example of the configuration of the molding machine 1 according to the first embodiment. The molding machine 1 is a twin-screw kneading extruder, for example, and is provided with a cylinder 10 with hopper 10*a* into which resin raw materials are invested and two screw shafts (rotary shafts) 11. Since the two screw shafts 11 are aligned in the direction of the depth of the sheet of paper in FIG. 3, only one of the screw shafts 11 is illustrated in FIG. 3. The two screw shafts 11 are arranged substantially parallel with each other in mesh and are rotatably inserted into a hole of the cylinder 10. The screw shafts 11 carry the resin raw materials invested into the hopper 10*a* in the direction of extrusion (to the right in FIG. 2 and FIG. 3) and melt and knead the materials.

The screw shaft 11 is configured as a bar of single screw shaft 11 by combining and integrating several types of screw pieces. For example, the screw shaft 11 is configured by arranging and combining a flight screw-shaped forward flight piece that carries resin raw materials in a forward direction, a reverse flight piece that carries resin raw materials in a reverse direction, a kneading piece that kneads resin raw materials and the like in an order and at positions according to the characteristics of the resin raw materials.

The cylinder 10 is configured to be a bar of cylinder 10 by combining multiple block cylinders.

As illustrated in FIG. 2, the molding machine 1 is further provided with a motor 12 that outputs driving force to rotate the screw shaft 11, a speed reducer 13 that reduces the transmission speed of the driving force output by the motor 12 and a control device 14. The screw shaft 11 is coupled to an output shaft of the speed reducer 13. The screw shaft 11 is rotated by the driving force of the motor 12 that is reduced in transmission speed by the speed reducer 13.

The sensor 5 detects a physical quantity related to the molding machine 1 and outputs sensor value data indicating the detected physical quantity to the edge computer 6. The physical quantities related to the molding machine 1 include physical quantities obtained from the molding machine 1 and physical quantities obtained from a molded product produced by the molding machine 1. The physical quantities include temperature, position, velocity, acceleration, current, voltage, pressure, time, image data, torque, force, distortion, power consumption, weight and the like. These physical quantities can be measured by using a thermometer, a position sensor, a speed sensor, an accelerometer, an ammeter, a voltmeter, a pressure gauge, a timer, a camera, a torque sensor, a wattmeter, a weightometer and the like.

More specifically, the sensor 5 that detects the physical quantities related to the operation of the molding machine 1 includes a vibration sensor such as acceleration sensor for detecting vibrations of the speed reducer 13, a torque sensor for detecting output torque of the motor 12, a torque sensor for detecting axial torque applied to the screw shaft 11, a displacement sensor for detecting displacement of the rotation center of the screw shaft 11, a vibration sensor for detecting vibrations of the screw shaft 11, a thermometer for detecting the temperature of the screw shaft 11, a resin temperature sensor for detecting resin temperature, a resin pressure sensor for detecting resin pressure, an outlet temperature sensor for detecting outlet temperature, and an outlet pressure sensor for detecting outlet resin pressure.

The sensor 5 for detecting the physical quantities related to a molded product includes an optical measuring instrument and an imaging sensor for detecting the dimensions, chromaticity and luminance of a molded product and a weightometer for detecting the weight of a molded product.

The control device 14 is a computer that performs operation control of the molding machine 1 and has a transmission/reception unit (not illustrated) for transmitting and receiving information to and from the edge computer 6, a timer unit and a display unit.

More specifically, the control device 14 transmits a machine ID for identifying multiple molding machines 1, a date, a molding machine control parameter, machine configuration data and basic data to the edge computer 6. The molding machine control parameter includes, for example, a feeder supply amount (supply amount of the resin raw material), the number of turns of the screw shaft 11, an extruded amount, a cylinder temperature, a resin pressure and motor current. The machine configuration data is information indicating the model number, screw configuration, cylinder configuration, die shape and the like of the molding machine 1. The basic data is information indicating the physical properties of resin raw materials.

The control device 14 receives information indicating a condition of the molding machine 1 transmitted from the edge computer 6 and displays the received information. Furthermore, the control device 14 executes the processing of monitoring the presence or absence of an abnormality of the molding machine 1 using the information indicating the condition of the molding machine 1, outputting an alert as necessary and stopping the operation of the molding machine 1.

Figure 4:
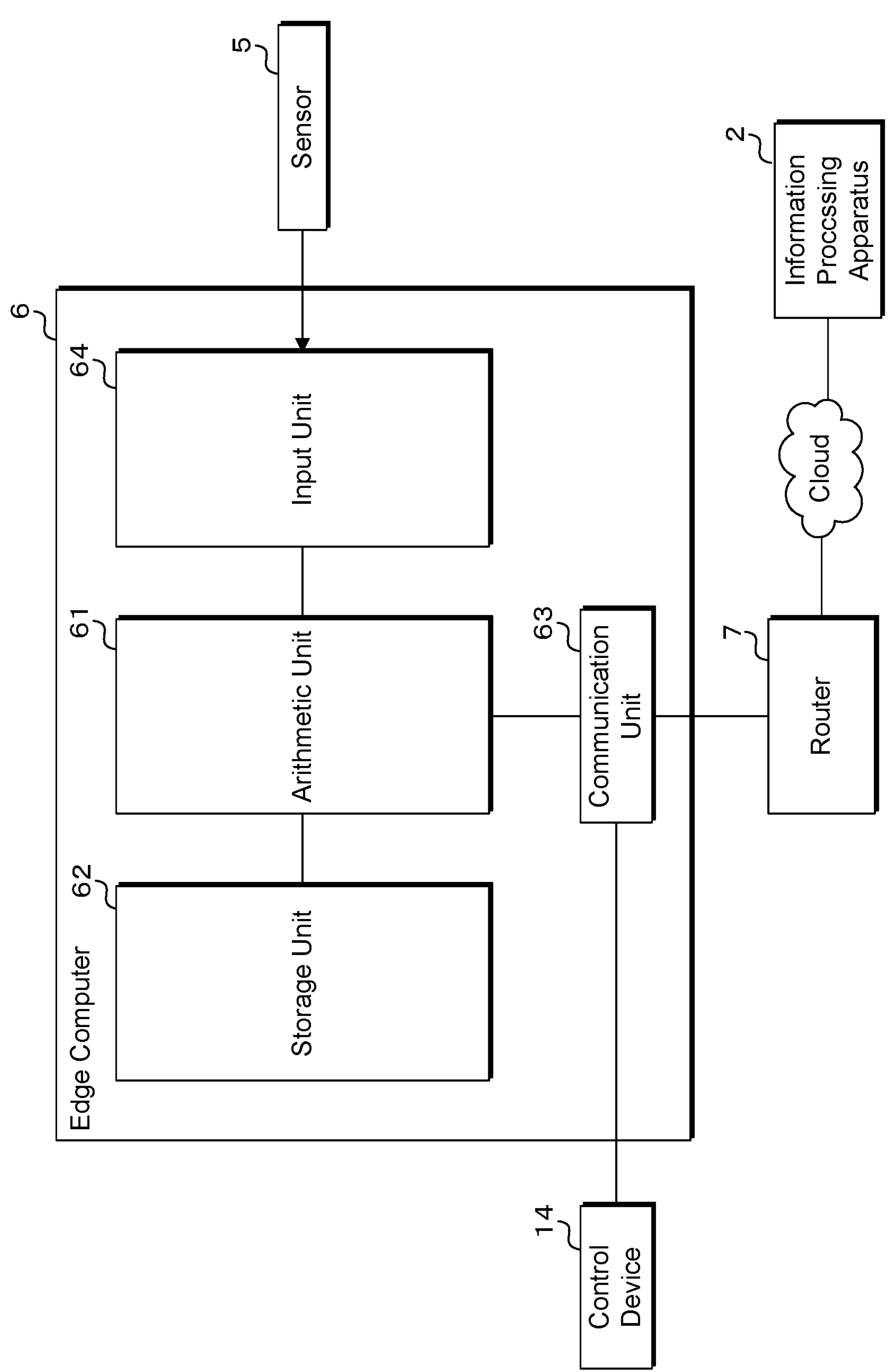
FIG. 4 is a block diagram illustrating an example of the configuration of an edge computer according to the first embodiment.

FIG. 4 is a block diagram illustrating an example of the configuration of the edge computer 6 according to the first embodiment. The edge computer 6 has an arithmetic unit 61, a storage unit 62, a communication unit 63 and an input unit 64, the storage unit 62, the communication unit 63 and the input unit 64 being connected to the arithmetic unit 61. The edge computer 6 has a lower hardware specification than the information processing apparatus 2, which will be described later, and is for executing simple abnormality detection processing of the molding machine 1 and processing of transmitting and receiving necessary information for condition detection processing in the information processing apparatus 2. It is noted that the specific circuit configuration of the edge computer 6 and the type of the computer are not limited to particular ones.

The arithmetic unit 61 includes an arithmetic processing circuit such as a CPU (Central Processing Unit), a multi-core CPU, an Application Specific Integrated Circuit (ASIC) or a Field-Programmable Gate Array (FPGA), an internal storage device such as a ROM (Read Only Memory), a RAM (Random Access Memory), an I/O terminal and the like. The arithmetic unit 61 functions as the edge computer 6 according to the first embodiment by executing an edge program (program product) stored in the storage unit 62, which will be described later. Note that each functional part of the edge computer 6 may be realized in software, or some or all of the functional parts thereof may be realized in hardware.

The storage unit 62 is a nonvolatile memory such as a hard disk, an Electrically Erasable Programmable ROM (EEPROM), a flash memory or the like. The storage unit 62 stores an edge program for causing the arithmetic unit 61 to execute simple abnormality detection processing of the molding machine 1.

The communication unit 63 is a communication circuit that transmits and receives information according to a predetermined communication protocol such as the Ethernet (registered trademark). The communication unit 63 is connected to the control device 14 over a first communication network such as LAN or the like, and the arithmetic unit 61 can transmit and receive various information to and from the control device 14 via the communication unit 63.

The first network is connected to the router 7, and the communication unit 63 is connected to the information processing apparatus 2 on the cloud, which is a second communication network. The arithmetic unit 61 can transmit and receive various information to and from the information processing apparatus 2 via the communication unit 63 and the router 7.

The input unit 64 is an input interface to which signals are input. The input unit 64 is connected to the sensor 5 and receives an input of sensor value data that is output from the sensor 5.

Figure 5:
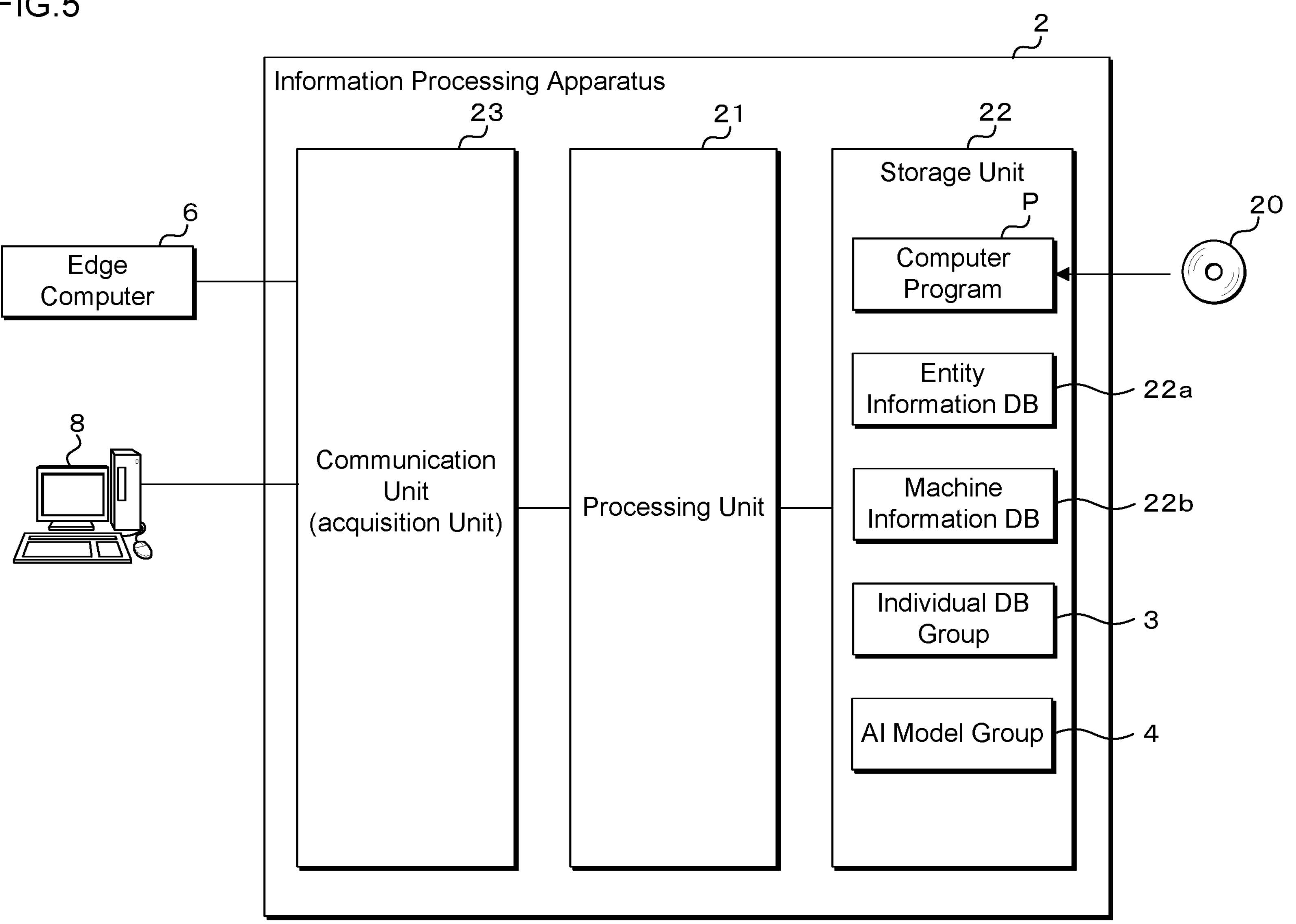
FIG. 5 is a block diagram illustrating an example of the configuration of an information processing apparatus according to the first embodiment.

FIG. 5 is a block diagram illustrating an example of the configuration of the information processing apparatus 2 according to the first embodiment. The information processing apparatus 2 is a computer and includes a processing unit 21, a storage unit 22 and a communication unit 23. The storage unit 22 and the communication unit 23 are connected to the processing unit 21.

The processing unit 21 includes an arithmetic processing circuit such as a CPU, a multi-core CPU, a GPU (Graphics Processing Unit), a General-Purpose computing on Graphics Processing Units (GPGPU), a Tensor Processing Unit (TPU), an ASIC, an FPGA or a Neural Processing Unit (NPU), an internal storage such as a ROM or a RAM, an I/O terminal and the like. The processing unit 21 functions as the information processing apparatus 2 according to the first embodiment by executing a computer program (program product) P stored in the storage unit 22, which will be described later. Note that each functional part of the information processing apparatus 2 may be realized in software, or some or all of the functional parts thereof may be realized in hardware.

The storage unit 22 is a nonvolatile memory such as a hard disk, an EEPROM (Electrically Erasable Programmable ROM) or a flash memory. The storage unit 22 stores a computer program P for causing the computer to execute condition detection processing of the molding machine 1, an entity information DB 22*a*, a machine information DB 22*b*, an individual DB group 3 and an AI model group 4.

The computer program P may be recorded on a recording medium 20 so as to be readable by the computer. The storage unit 22 stores the computer program P read from the recording medium 20 by a reader (not illustrated). The recording medium 20 is a semiconductor memory such as a flash memory. Furthermore, the recording medium 20 may be an optical disc such as a CD (Compact Disc)-ROM, a DVD (Digital Versatile Disc)-ROM, or a BD (Blu-ray (registered trademark) Disc). Moreover, the recording medium 20 may be a magnetic disk such as a flexible disk or a hard disk, or a magneto-optical disk. In addition, the computer program P may be downloaded from an external server (not illustrated) connected to a communication network (not illustrated) and may be stored in the storage unit 22.

The communication unit 23 is a communication circuit that transmits and receives information according to a predetermined communication protocol such as the Ethernet (registered trademark). The communication unit 23 is connected to the edge computer 6 and the terminal device 8 over the second communication network, and the processing unit 21 can transmit and receive various information to and from the edge computer 6 and the terminal device 8 via the communication unit 23.

Figure 6:
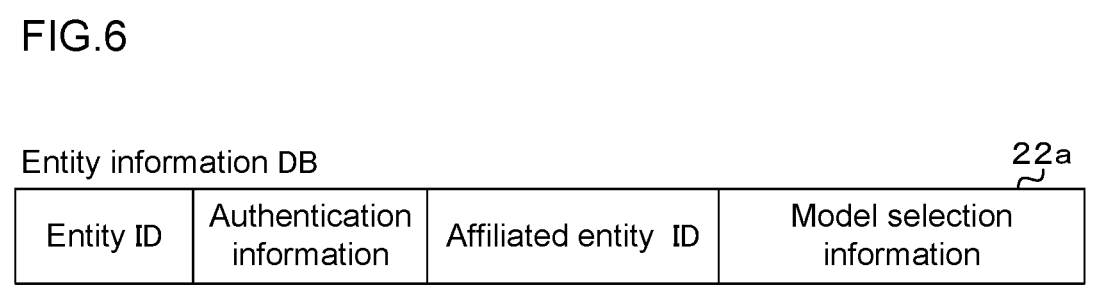

FIG. 6 is a conceptual diagram presenting an example of a record layout of the entity information DB 22*a* according to the first embodiment. The entity information DB 22*a* includes a hard disk and Data Base Management System (DBMS), and stores information related to the entity A, which is the user. For example, the table of the entity information DB 22*a* has a "entity ID" column, an "authentication information" column, an "affiliated entity ID" column and a "model selection information" column.

The "entity ID" column stores identifying information unique to each entity A for identifying the multiple entities A. The "authentication information" column stores information for authenticating each entity A. The "affiliated entity ID" column stores the ID of another entity A that constitutes the affiliated entity group A and that shares the information necessary for condition detection of the molding machine 1. The "model selection information" column stores information (hereinafter referred to as "model selection information") indicating the learning model selected by an entity A out of the multiple learning models, that is, the learning model used by this entity A. The details of the model selection information are described below.

Figure 7:
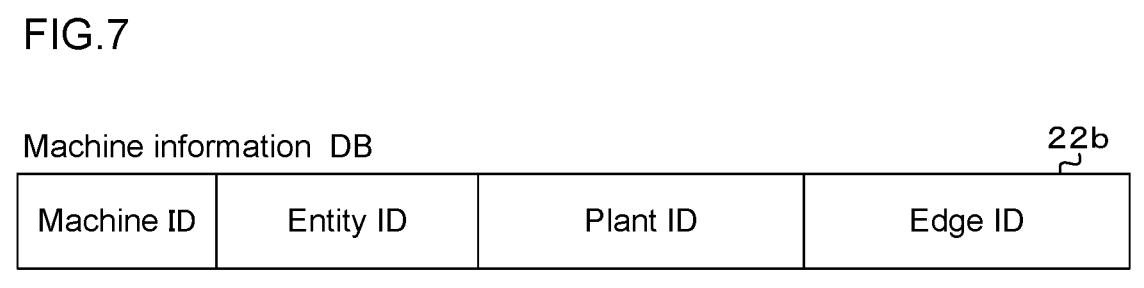

FIG. 7 is a conceptual diagram presenting an example of a record layout of the machine information DB 22*b* according to the first embodiment. The machine information DB 22*b* stores information related to the molding machine 1. For example, the table of the machine information DB 22*b* has a "machine ID" column, a "entity ID" column, a "plant ID" column and an "edge ID" column.

The "machine ID" column stores identifying information unique to each molding machine 1 to identify the multiple molding machines 1. The "entity ID" column stores an ID of the entity A that uses the relevant molding machine 1. The "plant ID" column stores an ID of the plant where the relevant molding machine 1 is located. The "edge ID" column stores an ID to identify the edge computers 6 connected to the relevant molding machine 1.

Figure 8:
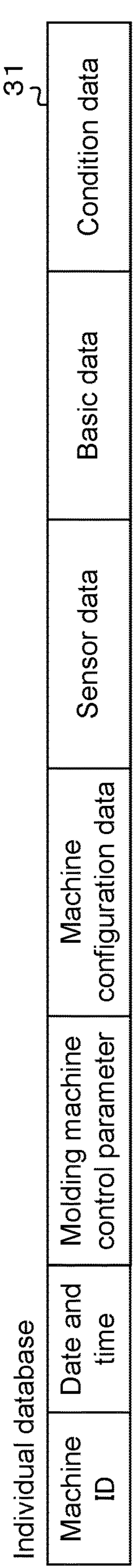
FIG. 8 is a conceptual diagram presenting an example of a record layout of an individual database constituting an individual DB group according to the first embodiment.

FIG. 8 is a conceptual diagram presenting an example of a record layout of an individual database constituting an individual DB group according to the first embodiment. The individual DB stores the information detected by the sensor 5. For example, a table of the individual DB has a "machine ID" column, a "date and time" column, a "molding machine control parameter" column, a "machine configuration data" column, a "sensor data" column, a "basic data" column and a "condition data" column.

The "machine ID" column stores the ID of the molding machine 1 as a target for detection. The "date and time" column stores date and time when a physical quantity related to the molding machine 1 is detected. The "molding machine control parameter" column stores parameters for controlling the molding machine 1, such as the number of turns of the screw, the feed amount or extrusion amount of resin raw materials, cylinder temperature and the like. The "machine configuration data" column stores data indicating the configuration of the molding machine 1 such as the model number of the molding machine 1, the screw configuration, the cylinder 10 configuration, the die shape and the like. The "sensor data" column stores a sensor value obtained from the sensor 5 disposed at the molding machine 1, for example, vibrations of the speed reducer 13, an axial torque, a motor torque, vibrations of the shaft, resin temperature, resin pressure, outlet resin temperature, outlet resin pressure, image data obtained by imaging a strand and the like. The "basic data" column stores data indicating resin raw materials such as physical properties of resin.

The "condition data" column stores data indicating the condition in the case where the condition of the molding machine 1 when the sensor value is obtained is confirmed. The data indicating the condition of the molding machine 1 stores information indicating whether or not each part of the molding machine 1 such as the speed reducer 13, the screw or the like is normal and whether or not the operating condition of the molding machine 1 is normal.

The "condition data" column may store information indicating specific abnormalities of the molding machine 1 and its operating condition.

The AI model group 4 includes multiple learning models for respectively detecting multiple types of conditions of the molding machine 1. The condition of the molding machine 1 detected by the molding machine system is, for example, an abnormal condition of each part of the molding machine 1 and its operating state. Abnormalities of the molding machine 1 include, for example, abnormal vibrations and overload of the speed reducer 13, dimensional abnormalities of a molded product, flaws, cracks, wear and corrosion of the screw shaft 11, performance degradation or oil abnormalities due to wear of the speed reducer 13 and the parts thereof, inefficient operating conditions (increase in consumed energy or the like), operating conditions causing poor quality (forced boot-up or the like), strand abnormalities (defects such as the dimensions, foreign objects, color, twist (distortion) or the like), abnormalities of resin viscosity (quality) and the like.

Among these abnormalities, the information processing apparatus 2 according to the first embodiment detects, using the AI model group 4, the presence or absence of an abnormality such as abnormal vibrations of the speed reducer 13, flaws, cracks, wear and corrosion of the screw shaft 11, performance degradation or oil abnormalities of the speed reducer 13, an inefficient operating condition, an operating condition causing poor quality and the like. The information processing apparatus 2 performs processing of specifying a failed part of the speed reducer 13, such as a bearing or a gear.

Specifically, the AI model group 4 includes a learning model for detecting abnormal vibrations of the speed reducer 13, a learning model for detecting flaws, cracks, wear and corrosion of the screw, a learning model for detecting performance degradation or oil abnormalities of the speed reducer 13, a learning model for detecting a failed part of the speed reducer 13, a learning model for detecting an inefficient operating condition, and a learning model for detecting an abnormal operating condition causing poor quality and the like.

Though the learning models constituting the AI model group 4 are each a model of Convolutional Neural Network (CNN) with a feature extraction layer, for example, one class classification model, neural network such as U-Net and Recurrent Neural Network (RNN) and other machine leaning models such as Support Vector Machines (SVMs), Bayesian networks or regression tree.

If sensor value data is time-series data, the information processing apparatus 2 may generate a time-series data image representing the sensor value data.

The learning model for detecting wear and the like of the screw, the learning model for detecting an inefficient operating condition and the learning model for detecting an abnormal operating condition are convolutional neural network models such as a one-class classification model that, if receiving an input of a time-series data image, for example, each extract the feature of the time-series data image and output the extracted feature. By comparing the feature in the normal condition with the feature as a target for the condition detection, the processing unit 21 can detect the presence or absence of an abnormality of the screw shaft 11, the inefficient operating condition and the abnormal operating condition. The feature in the normal condition is obtained by inputting, to the above-mentioned learning models, sensor value data that is associated with the molding machine control parameters, the machine configuration data and the basic data the same as or similar to the molding machine control parameters, the machine configuration data and the basic data related to the target for the condition detection obtained from the molding machine 1, and that is obtained when the molding machine 1 operates norm ally.

The one-class classification model was described above. In the case where the sensor value data in the normal condition and the sensor value data in the various abnormal conditions are accumulated, however, training data sets obtained by labeling the sensor value data or time-series data image with the condition of the molding machine 1 set as teacher data are created, and the learning model composed of CNN or the like may be trained using these training data sets.

The learning model has an input layer, an intermediate layer and an output layer. The intermediate layer has multiple convolutional layers and multiple pooling layers for extracting the feature of an image. The output layer has multiple nodes respectively corresponding to the multiple conditions of the molding machine 1 and outputs the certainty factors corresponding to these conditions. The learning model optimizes the weighting factors in the intermediate layer so that the conditions of the molding machine 1 output from the learning model, when sensor value data or time-series data images related to the sensor value data are input, are close to the condition indicated by the teacher data. Such weighting factors are weights (coupling coefficients) between neurons, for example. Various methods can be used for optimizing parameters such as the steepest-descent method, the error back propagation method or the like though not limited to a particular one.

The learning model thus generated allows diagnosis of the condition of the molding machine 1 by inputting to the learning model the time-series data image of the sensor value data obtained from the molding machine 1 as a target for diagnosis. For example, the processing unit 21 determines that the molding machine 1 is in a condition for the node that outputs the highest certainty.

In addition, if receiving an input of the time-series data image, the learning model may be configured to output more suitable molding setup conditions or adjustment amounts of the molding setup conditions. The information processing apparatus 2 transmits the molding setup conditions output from the learning model to the edge computer 6, and the edge computer 6 transmits the received molding setup conditions to the control device 14.

The learning model for detecting abnormal vibrations of the speed reducer 13 includes an RNN that outputs data indicating the presence or absence of an abnormality of the speed reducer 13 when the sensor value data obtained from the vibration sensor are input. Moreover, for the sensor value data or the time-series data image obtained from the vibration sensor, the learning model similar to the above-mentioned one-class classification model may be used to detect an abnormality of the speed reducer 13 according to a similar method.

The learning model for detecting performance degradation or oil abnormalities of the speed reducer 13 may employ SVM or the like. Furthermore, the learning model similar to the above-mentioned one-class classification model may be used for detecting the presence or absence of performance degradation or oil abnormalities of the speed reducer 13 according to a similar method.

The learning model for detecting a failed part of the speed reducer 13 may employ a multi-class classification model using a neural network.

Meanwhile, the edge computer 6 detects an overload, a dimensional abnormality of a molded product, a strand abnormality, an abnormality of resin viscosity and the like based on the sensor value data. Specifically, the edge computer 6 calculates statistics such as the mean, covariance and root mean square for the sensor values and detects an overload of the speed reducer 13, an abnormality of resin viscosity and the like with the processing of low load based on the calculated statistics.

Moreover, the edge computer 6 calculates the difference between the captured image of a molded product and the captured image of a normal molded product to thereby detect a dimensional abnormality of the molded product and a strand abnormality.

Since the allotment of the abnormality detection processing performed by the edge computer 6 and the condition detection processing performed by the information processing apparatus 2 are mere examples, such processing may also be executed by the edge computer 6 side if possible.

FIG. 9 is a conceptual diagram presenting an example of model selection information. FIG. 9 indicates the concept of the model selection information and does not indicate the database structure thereof. The model selection information stores an entity ID and information indicating a learning model to be used or a learning model not to be used by the entity A indicated by this entity ID. The check mark in FIG. 9 indicates that a learning model is used while the blank indicates that this learning model is not used. Each entity A can select which learning model is to be used out of the multiple learning models at its own discretion in order to detect the condition of the molding machine 1 used by this entity A.

For example, the model selection information for the entity A1 indicates that the entity A1 uses all the learning models. The model selection information for the entity A2 indicates that the entity A2 uses the learning model for detecting wear of the screw, the learning model for detecting deterioration of the speed reducer 13 and the learning model for detecting an abnormal operating condition of the molding machine 1. The model selection information for the entity A3 indicates that the entity A3 uses the learning model for detecting abnormal vibrations of the speed reducer 13, the learning model for detecting wear of the screw, the learning model for detecting degradation of the speed reducer 13 and the learning model for detecting a failed part of the speed reducer 13.

Figure 10:
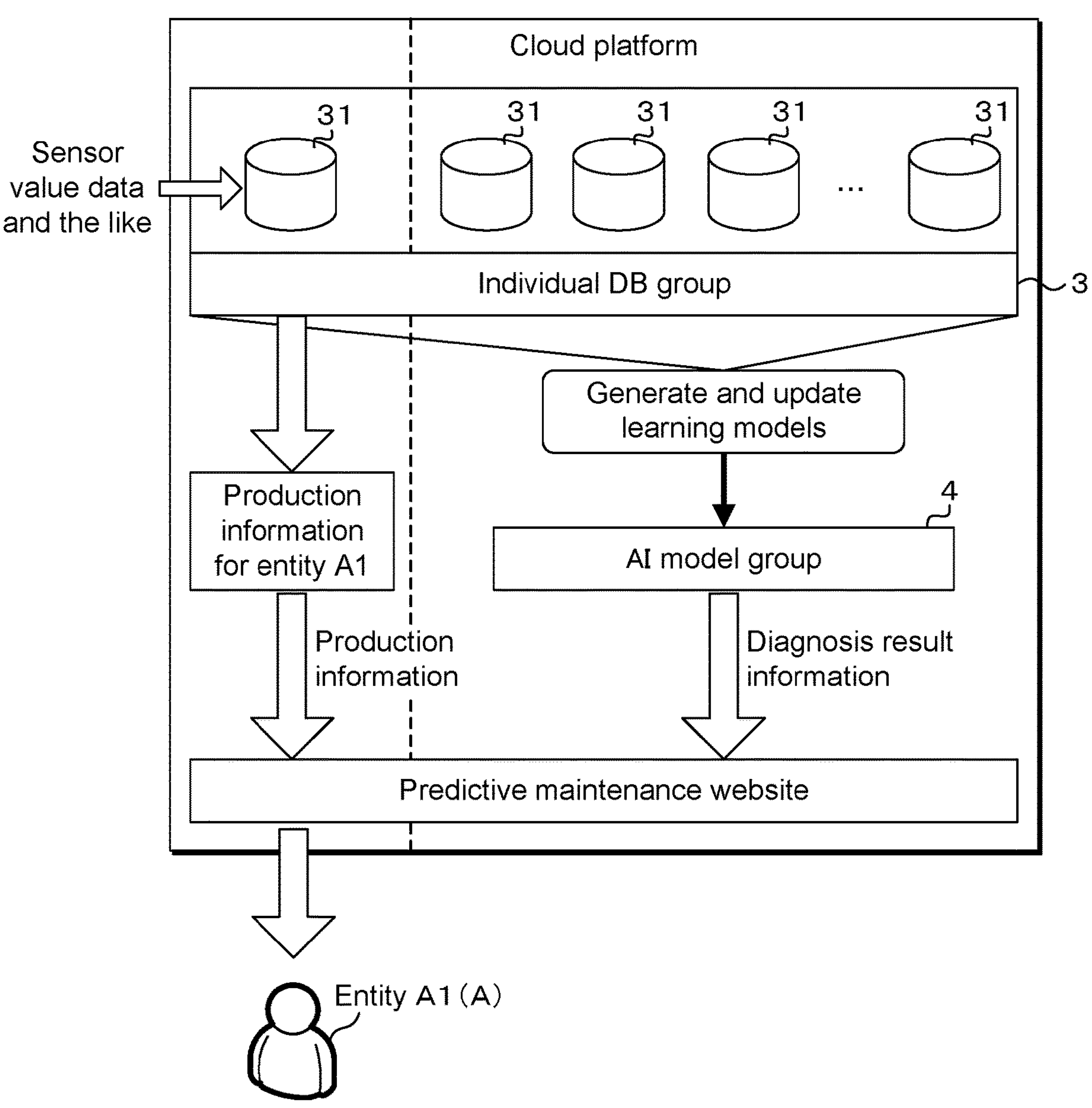
FIG. 10 is a conceptual diagram illustrating an example of a cloud platform provided by the information processing apparatus.

FIG. 10 is a conceptual diagram illustrating an example of a cloud platform provided by the information processing apparatus 2. As illustrated in FIG. 10, the information processing apparatus 2 individually stores the sensor value data collected from the entities A in the individual databases 31 for the respective entities A. Each entity A can only access the individual database 31 of its own to refer to the sensor value data and cannot access the individual databases 31 of other entities A.

By using the sensor value data accumulated in the individual databases 31 of the respective entities A, the information processing apparatus 2 generates the AI model group 4. By using the sensor value data accumulated in the individual databases 31 of the respective entities A, the information processing apparatus 2 also updates the AI model group 4. By using the sensor value data collected from the multiple entities A, a wide variety of multiple learning models can be generated. Each entity A can select a desired learning model or a learning model most suitable for the entity A from the multiple learning models at its own discretion.

If receiving transmission of sensor value data of the molding machine 1 from one entity A to request for the condition detection, the information processing apparatus 2 inputs the sensor value data to one or more of the learning models to detect the condition of the molding machine 1 and transmits the detection result of the condition to this entity A. The entity A has limited access so as not to refer to the AI model group 4 and can obtain only the detection result of the condition acquired by using the AI model group 4.

Figure 11:
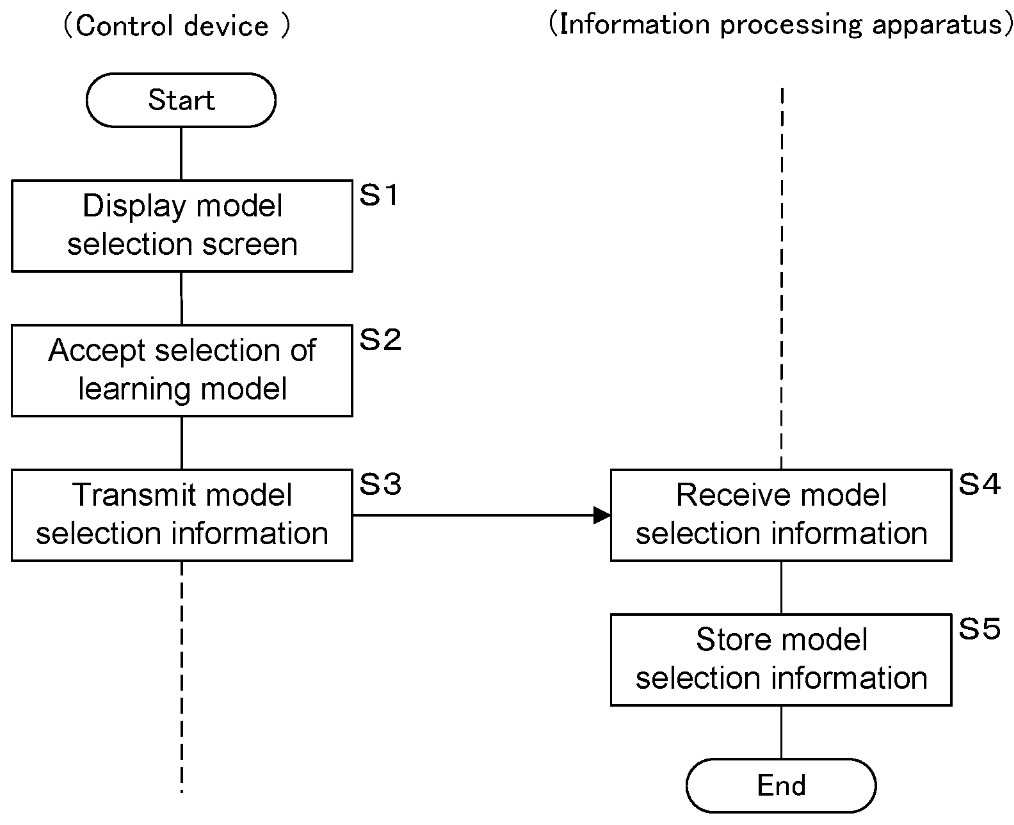
FIG. 11 is a flowchart illustrating a processing procedure for selecting a learning model.

FIG. 11 is a flowchart illustrating a processing procedure for selecting a learning model. The information processing apparatus 2 executes processing of authenticating the user of the control device 14 or the terminal device 8. If the user is successfully authenticated, the information processing apparatus 2 provides the control device 14 or the terminal device 8 with a model selection screen to execute the processing of selecting a learning model to be used by the entity A, which is the user, via the control device 14 or the terminal device 8 as described below.

The control device 14 or terminal device 8 that is successfully authenticated displays the model selection screen (step S1) and accepts the selection of a learning model to be used by the entity A (step S2). For example, the entity A1, which is the user, can select one or more learning models to be used by the entity A1 from the multiple learning models. The information processing apparatus 2 accepts the one or more learning models selected by the entity A1.

The control device 14 or the terminal device 8 transmits the model selection information indicating the learning model to be used or the learning model not to be used that is received at step S2 and the entity ID to the information processing apparatus 2 (step S3).

The information processing apparatus 2 receives the model selection information and the entity ID that are transmitted from the control device 14 or the terminal device 8 (step S4), and stores the received model selection information in association with the entity ID in the entity information DB 22*a* (step S5).

Figure 13:
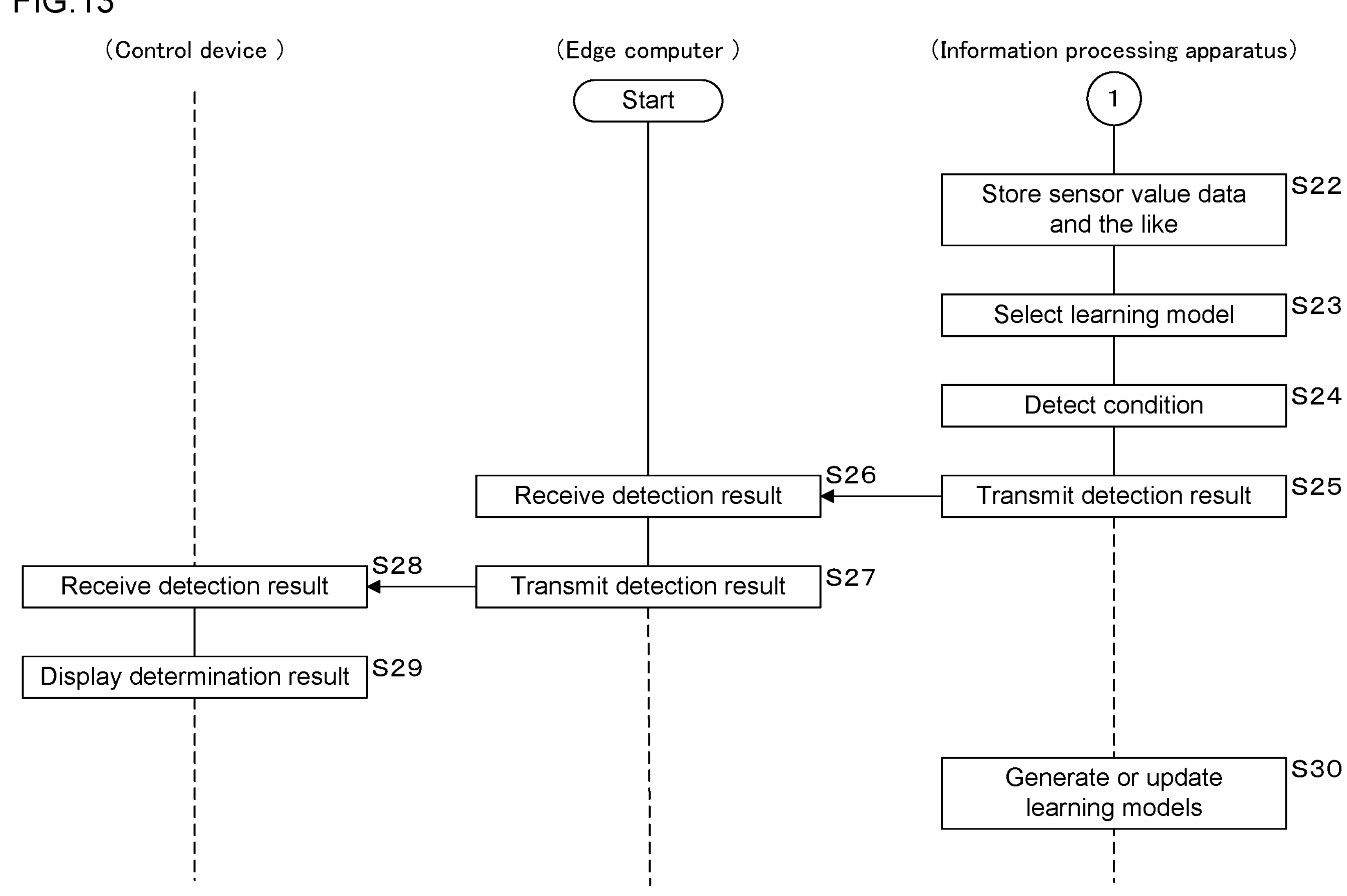
FIG. 13 is a flowchart illustrating a processing procedure related to the condition detection of the molding machine according to the first embodiment.

FIG. 12 and FIG. 13 are each a flowchart showing the processing procedure related to condition detection of the molding machine 1 according to the first embodiment. The control device 14 of the molding machine 1 used by each entity A transmits the machine ID, the molding machine control parameter indicating the state of the operation control of the molding machine 1, the machine configuration data and the basic data to the edge computer 6 (step S11).

The arithmetic unit 61 of the edge computer 6 receives through the communication unit 63 the machine ID, the molding machine control parameter, the machine configuration data and the basic data that are transmitted from the control device 14 (step S12).

The arithmetic unit 61 acquires time-series sensor value data that is output from the sensor 5 of the molding machine 1 used by each of the multiple entities A (step S13). The arithmetic unit 61 then calculates statistics such as the mean, covariance and root mean square of the sensor values based on the sensor value data (step S14) and performs simple abnormality determination processing of the molding machine 1 based on the calculated statistics (step S15).

Next, the arithmetic unit 61 transmits a determination result indicating the presence or absence of an abnormality for the molding machine 1 and the statistics calculated at step S14 to the control device 14 through the communication unit 63 (step S16).

The control device 14 receives the determination result and the statistics that are transmitted from the edge computer 6 (step S17) and monitors the operation of the molding machine 1 based on the received determination result or statistics (step S18). For example, if the determination result indicates a predetermined abnormality, the control device 14 stops the operation control of the molding machine 1.

The control device 14 then causes a display unit to display the received determination result, the statistics and the like (step S19).

Subsequently, the processing performed by the edge computer 6 having transmitted the determination result and the statistics is described. The arithmetic unit 61 of the edge computer 6 having finished the processing at step S16 transmits the machine ID, the molding machine control parameter, the machine configuration data and the basic data that are received at step S12 and the sensor value data acquired at step S13 to the information processing apparatus 2 through the communication unit 63 (step S20).

Here, it is preferable that the arithmetic unit 61 of the edge computer 6 is configured to transmit to the information processing apparatus 2 other detectable sensor value data as well as the sensor value data necessary for the learning model used by the entity A, which uses this edge computer 6 or this molding machine 1. The reason is that the other sensor value data can be used for generating or updating the leaning models used by other entities A. Each entity A sends or provides many types of sensor value data to the information processing apparatus 2, so that the AI model group 4 that are more varied can be generated.

The information processing apparatus 2 receives the machine ID, the molding machine control parameter, the machine configuration data, the basic data and the sensor value data that are transmitted from the edge computer 6 (step S21). The processing unit 21 stores the molding machine control parameter, the machine configuration data, the basic data and the sensor value data in the individual database 31 of the entity A indicated by the entity ID corresponding to the received machine ID (step S22). Next, the information processing apparatus 2 selects the learning model to be used by this entity A with reference to the model selection information (step S23). The information processing apparatus 2 inputs the machine configuration data, the basic data and the sensor value data to the selected learning model to detect the condition of the molding machine 1 (step S24). The processing unit 21 then transmits the detection result to the edge computer 6 via the communication unit 23 (step S25).

The arithmetic unit 61 of the edge computer 6 receives the detection result transmitted from the information processing apparatus 2 (step S26) and transmits the received detection result to the control device 14 through the communication unit 63 (step S27).

The control device 14 receives the detection result transmitted from the edge computer 6 (step S28) and displays the received detection result on the display unit (step S29).

Note that in response to a request from the terminal device 8, the edge computer 6 can transmit the determination result as abnormal by the arithmetic unit 61, the calculated statistics of the sensor value data, the detection result by the processing unit 21 and the like to the terminal device 8. The terminal device 8 displays the received determination result as abnormal, statistics and detection result.

Meanwhile, in the case where a predetermine condition, such as a predetermined amount of sensor value data or the like being newly stored in the individual DB group 3, is satisfied, the processing unit 21 of the information processing apparatus 2 reads the sensor value data and the like stored in the individual DBs of the multiple entities A and generates or updates the learning models using the read sensor value data or the like (step S30).

In the case where the learning model is a one-class classification model, the processing unit 21 of the information processing apparatus 2 may train the learning model so as to output, when the time-series data image visualizing the sensor value data at the normal condition accumulated in the individual DB group 3 and any reference images are input to a learning model before trained or before updated, features having a high local density of the features of the time-series data image and having a high distinguishability among the features of the reference images. By being trained in this manner, the learning model can be generated or updated.

In the case where the learning model is a classification model, the processing unit 21 of the information processing apparatus 2 may optimize the various parameters in the learning model so that the difference between the training data and the detection result of the condition, which is output when the time-series data image that visualizes the sensor value data accumulated in the individual DB group 3 is input to the learning model before trained or before updated, is reduced using the steepest-descent method, the error back propagation method or the like. The teacher data is associated with the sensor value data and indicates the condition of the molding machine 1 when this sensor value data is obtained. By being trained in this manner, the learning model can be generated or updated.

As described above, the information processing method according to the first embodiment allows collection of the sensor value data of the molding machines 1 from the multiple entities A. By collecting sensor value data from a number of entities A, a wide variety of multiple learning models capable of detecting a wide variety of conditions of the molding machine 1 can be generated and updated using the sensor value data.

The learning model required by the individual entity A, which is the user of the information processing apparatus 2 or the most suitable learning model can be selected as appropriate and used.

Modified Example 1

The information processing apparatus 2 may be configured to execute billing processing for the condition detection processing using the leaning model. For example, the information processing apparatus 2 may calculate the fee for condition detection depending on the number of molding machines 1, the number of sensors 5, the types of the sensors 5, the data amount of a target for the condition detection processing, the number of learning models to be used and the like and may store, in the storage unit 22, the calculated fee for the condition detection, the user ID of the abnormality diagnosis system, the identification ID of the molding machine 1, the operating date, the data amount and the items for diagnosis in association with one another. The method of proffering the service related to the condition detection processing and billing therefor may be made based on a subscription system.

Furthermore, the charge for use of the leaning model may be increased or decreased depending on the amount of the sensor value data proffered by the entity A. In addition, for the entity A that proffers a predetermined amount of sensor value data, the charge for use of a part of the learning model may be free of charge.

Modified Example 2

The update timing for a learning model may be a regular one, such as on a monthly basis, or may be the timing when new information related to a new abnormal mode is acquired, the timing when the condition detection accuracy is deviated from the reality, or the timing when the condition detection accuracy decreases, though not limited to a particular one. The update of a learning model may be configured to run automatically or may be configured to initiate an update in response to the user's instruction.

Second Embodiment

The information processing method, information processing apparatus 2, molding machine system and computer program P according to a second embodiment are different from those of the first embodiment mainly in the configuration of the AI model group 4, the model selection information and the processing procedure. Since the other configurations of the molding machine system and the like are similar to those of the first embodiment, the corresponding parts are designated by the same reference codes and detailed description thereof will not be made.

Figure 14:
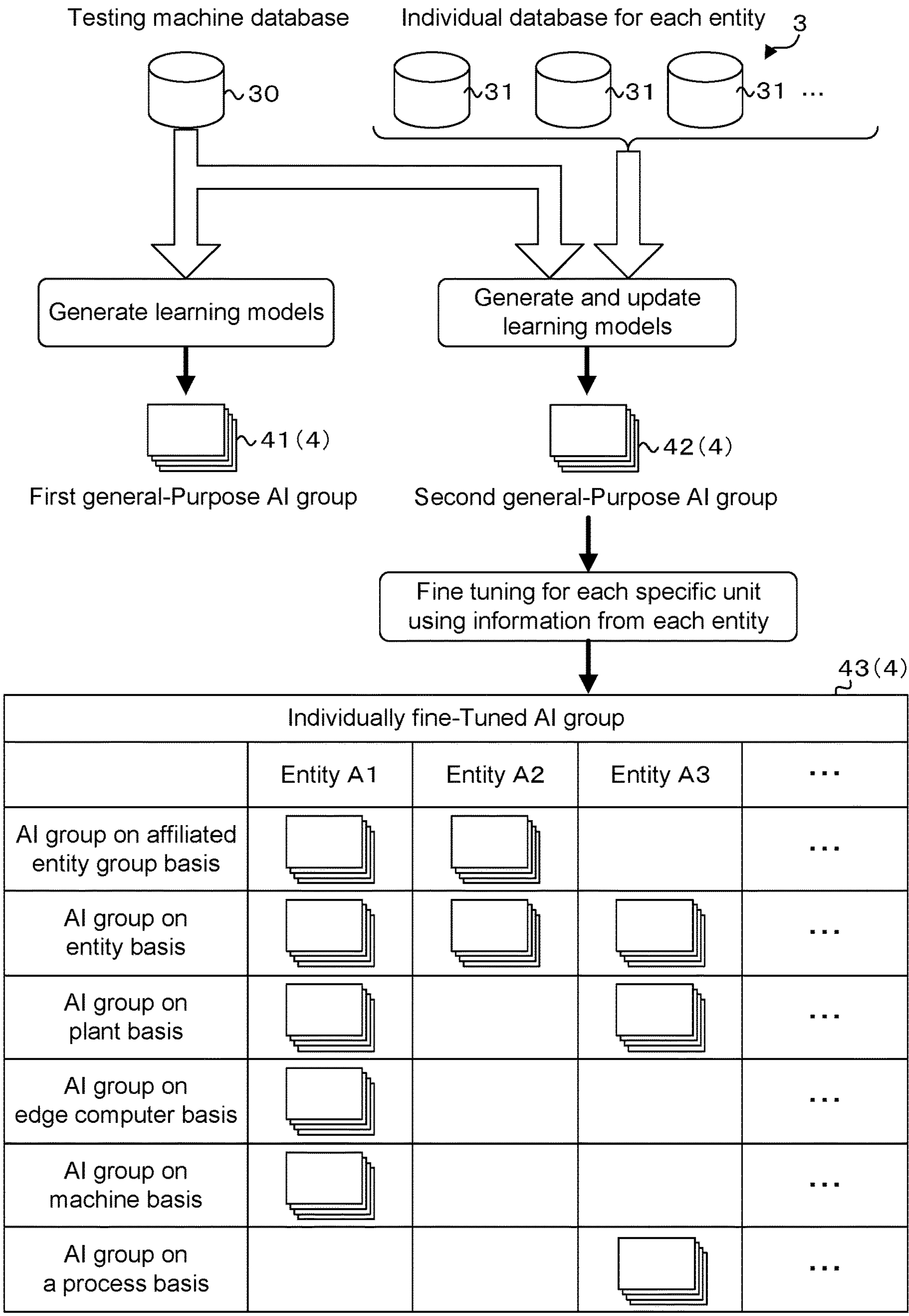
FIG. 14 is a conceptual diagram illustrating a method of generating, updating and fine-tuning multiple learning models according to a second embodiment.

FIG. 14 is a conceptual diagram illustrating a method of generating, updating and fine-tuning multiple learning models according to the second embodiment. The individual DB group 3 according to the second embodiment is provided with multiple individual databases 31 respectively prepared for the entities A and a testing machine database 30. The testing machine database 30 stores sensor value data obtained by operating the molding machine 1 as a testing machine, a molding machine control parameter, a machine configuration data and a basic data. For the testing machine, a molding machine 1 under a simulated abnormal condition is prepared, and the sensor value data obtained from this molding machine 1 can be stored in association with the information indicating the abnormal condition in the testing machine database 30. A simulator that reproduces the operation of the molding machine 1 may be used to calculate sensor value data and the like, and the calculated sensor value data may be stored in the testing machine database 30.

The AI model group 4 according to the second embodiment includes a first general-purpose AI group 41, a second general-purpose AI group 42 and an individually fine-tuned AI group 43.

The information processing apparatus 2 according to the second embodiment generates the first general-purpose AI group 41 for detecting the condition of the molding machine 1 using the sensor value data and the like stored in the test machine database 30. As in the first embodiment, the first general-purpose AI group 41 includes a first general-purpose learning model for detecting abnormal vibrations of the speed reducer 13, a first general-purpose learning model for detecting flaws, cracks, wear and corrosion of the screw, a first general-purpose learning model for detecting performance degradation or oil abnormalities of the speed reducer 13, a first general-purpose learning model for detecting a failed part of the speed reducer 13, a first general-purpose learning model for detecting an inefficient operating condition, and a first general-purpose learning model for detecting an abnormal operating condition causing poor quality and the like.

In the case where there is insufficient sensor value data stored in the testing machine database 30, the second general-purpose learning model may be generated without the first general-purpose learning model being generated.

The information processing apparatus 2 generates the second general-purpose AI group 42 for detecting a condition of the molding machine 1 using the test machine database 30 and the sensor value data stored in the individual database 31 for each entity A. As in the first embodiment, the second general-purpose AI group 42 includes a second general-purpose learning model for detecting abnormal vibrations of the speed reducer 13, a second general-purpose learning model for detecting flaws, cracks, wear and corrosion of the screw, a second general-purpose learning model for detecting performance degradation or oil abnormalities of the speed reducer 13, a second general-purpose learning model for detecting a failed part of the speed reducer 13, a second general-purpose learning model for detecting an inefficient operating condition, and a second general-purpose learning model for detecting an abnormal operating condition causing poor quality and the like.

In general, the second general-purpose AI group 42 can detect the condition of the molding machine 1 more accurately than the first general-purpose AI group 41.

Furthermore, the second general-purpose AI group 42 is more varied than the first general-purpose AI group 41. Since the information processing apparatus 2 can use large amounts of sensor value data collected from the entities A, it can generate or update more second general-purpose learning models and detect a wider variety of conditions. In other words, it is possible to generate learning models that cannot be generated only with sensor value data obtained from the testing machine database 30.

In addition, the information processing apparatus 2 fine-tunes the first general-purpose learning model using the sensor value data and the like stored in the individual database 31 to generate the second general-purpose learning model.

Moreover, the information processing apparatus 2 individually fine-tunes the second general-purpose learning models using the sensor value data and the like stored in the individual database 31 of each entity A to acquire an individually fine-tuned AI group 43. The unit of performing fine tuning has a hierarchical structure as illustrated in FIG. 14.

The sensor value data and the like are basically stored in the individual database 31 for each entity A, and fine tuning is performed by each entity A. However, if there is an affiliated entity group, a learning model shared by the affiliated entity group may be generated using the sensor value data of multiple entities A that constitute the affiliated entity group.

Figure 15:
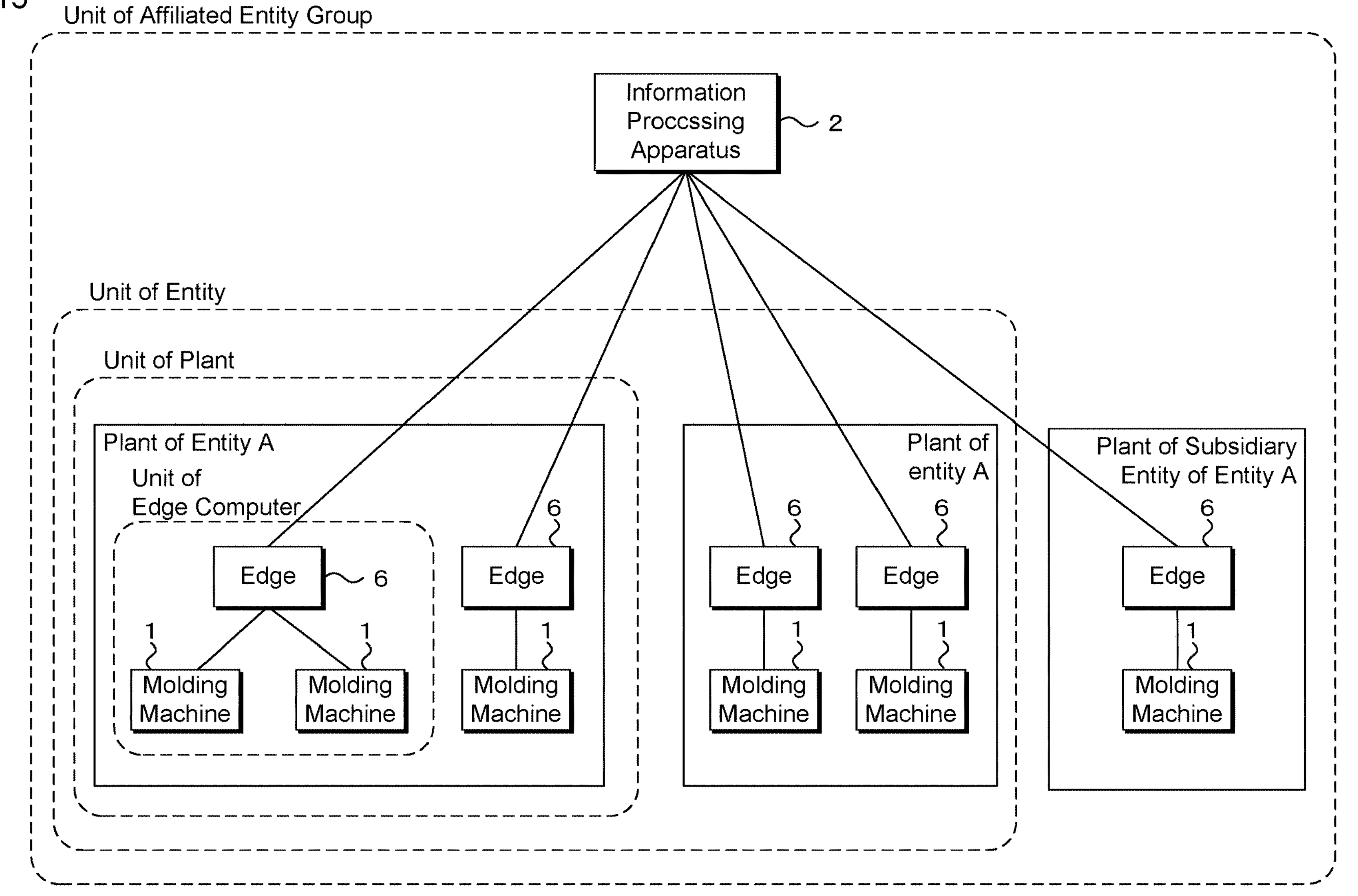
FIG. 15 is a conceptual diagram illustrating a hierarchical structure related to fine tuning of a learning model according to the second embodiment.

FIG. 15 is a conceptual diagram illustrating a hierarchical structure related to fine tuning of a learning model according to the second embodiment. Note that the edge computer 6 is abbreviated as an edge in FIG. 15.

The information processing apparatus 2 fine-tunes the second general-purpose learning model based on the sensor value data and the like stored in the individual databases 31 of the multiple entities A that constitute the affiliated entity group A to optimize the second general-purpose learning model for use in the molding machine 1 of the affiliated entity group.

The information processing apparatus 2 fine-tunes the second general-purpose learning model based on the sensor value data and the like stored in the individual database 31 of each entity A to optimize the second general-purpose learning model for use in the molding machine 1 of each entity A. If there is a learning model fine-tuned for affiliated entity group, this learning model may be fine-tuned based on the sensor value data and the like stored in the individual database of each entity A.

The information processing apparatus 2 fine-tunes the second general-purpose learning model based on the sensor value data and the like obtained from the molding machine 1 of each plant to optimize the second general-purpose learning model for use in the molding machine 1 of each plant. It is noted that the learning model fine-tuned for entity A may be fine-tuned based on the sensor value data and the like obtained from the molding machine 1 of each plant.

The information processing apparatus 2 fine-tunes the second general-purpose learning model based on the sensor value data and the like obtained from the molding machine 1 that is connected to a specific edge computer 6 to optimize the second general-purpose learning model for use in the molding machine 1 connected to this edge computer 6. It is noted that the learning model fine-tuned for plant may be fine-tuned based on the sensor value data and the like obtained from the molding machine 1 that is connected to this edge computer 6.

The information processing apparatus 2 fine-tunes the second general-purpose learning model based on the sensor value data and the like obtained from each molding machine 1 to optimize the second general-purpose learning model for use in each molding machine 1. It is noted that the learning models fine-tuned for entity A, for plant and for molding machine 1 connected to the edge computer 6 may be fine-tuned based on sensor value data and the like obtained from the molding machine 1 of each plant.

The information processing apparatus 2 fine-tunes the second general-purpose learning model based on the sensor value data that are obtained from multiple molding machines 1 of the same type that use the same material and stored in the individual database 31 of each entity A to optimize the second general-purpose learning model on a process basis. It is noted that the learning models fine-tuned for affiliated entity group, for entity A, for plant and for molding machine 1 connected to the edge computer 6 may be fine-tuned using the above-mentioned sensor value data related to a specific process.

FIG. 16 is a conceptual diagram presenting one example of model selection information according to the second embodiment. Each entity A can select the hierarchical level of fine tuning depending on the condition of the molding machine 1 as a detection target. The information processing apparatus 2 stores the hierarchical level of fine tuning selected by each entity A as model selection information. FIG. 16 is a conceptual diagram presenting model selection information of a certain entity A. Each column indicates the type of the learning model, and each row indicates the hierarchical level at which fine-tuning is executed.

In FIG. 16, a check mark indicates that the learning model is fine-tuned at the corresponding hierarchical level. For example, the table presents that the learning model for detecting abnormal vibrations of the speed reducer 13 employs the first general-purpose learning model without fine tuning. The table presents that the learning model for detecting wear of the screw employs the second general-purpose learning model without fine tuning.

The table presents that the learning model for detecting deterioration of the speed reducer 13 performs fine tuning on an affiliated entity group basis.

The table presents that the learning model for detecting a failed part of the speed reducer 13 performs fine tuning on an entity basis, a plant basis, an edge basis and a machine basis. The table presents that the learning model for detecting an inefficient operating condition performs fine tuning on an entity basis and an edge basis. Since not all the machines have enough sensor value data for the plant to perform fine tuning, learning models fine-tuned at the multiple hierarchical levels may coexist. For example, the first plant can use the learning model fine-tuned for this plant while the second plant can use the learning model fine-tuned for the entity due to insufficient sensor value data. The table presents that the learning model for detecting an abnormal operating condition employs fine tuning on a process basis.

Figure 17:
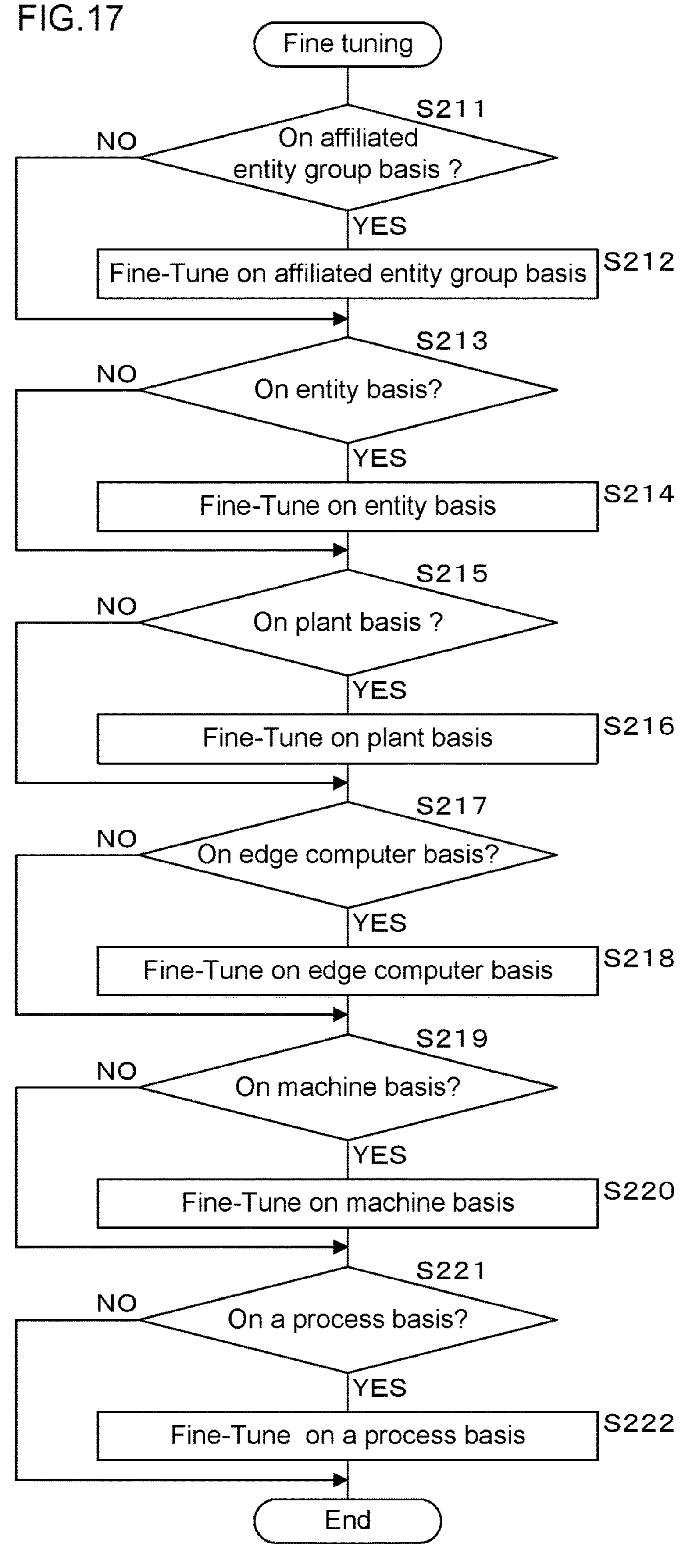
FIG. 17 is a flowchart illustrating a processing procedure related to fine tuning.

FIG. 17 is a flowchart illustrating a processing procedure related to fine tuning. The processing unit 21 of the information processing apparatus 2 performs fine tuning of learning models in each entity A at a predetermined timing. The processing unit 21 reads the model selection information of a single entity A and performs fine tuning up to the corresponding hierarchical levels for each of the multiple types of learning models. The following describes the processing of fine-tuning one type of learning model in a single entity A. The same processing applies to the fine-tuning method for the other training models.

The processing unit 21 determines whether or not fine tuning is to be performed on an affiliated entity group basis with reference to the model selection information (step S211). If it is determined that fine tuning is to be performed on an affiliated entity group basis (step S211: YES), the processing unit 21 reads the sensor value data and the like from the individual databases 31 of the entities A that constitute the affiliated entity group, and fine-tunes the second general-purpose learning model based on the read sensor value data (step S212).

If the processing at step S212 is completed, or if it is determined that fine tuning is not to be performed on an affiliated entity group basis (step S211: NO), the processing unit 21 determines whether or not fine tuning is to be performed on an entity basis with reference to the model selection information (step S213). If it is determined that fine tuning is to be performed on an entity basis (step S213: YES), the processing unit 21 reads the sensor value data and the like from the individual database 31 of this entity A and fine-tunes the second general-purpose learning model based on the read sensor value data (step S214). If the learning model fine-tuned at step S212 is present, the processing unit 21 may be configured to fine-tune this learning model.

If the processing at step S214 is completed, or if it is determined that fine tuning is not to be performed on an entity basis (step S213: NO), the processing unit 21 determines whether or not fine tuning is to be performed on a plant basis with reference to the model selection information (step S215). If it is determined that fine tuning is to be performed on a plant basis (step S215: YES), the processing unit 21 reads the sensor value data and the like of each plant from the individual database 31 of this entity A, and fine-tunes the second general-purpose learning model on a plant basis based on the read sensor value data (step S216). If the learning model fine-tuned at step S212 or step S214 is present, the processing unit 21 may be configured to fine-tune this learning model.

If the processing at step S216 is completed, or if it is determined that fine tuning is not to be performed on a plant basis (step S215: NO), the processing unit 21 determines whether or not fine tuning is to be performed on an edge basis with reference to the model selection information (step S217). If it is determined that fine tuning is to be performed on an edge basis (step S217: YES), the processing unit 21 reads the sensor value data and the like of the molding machines 1 connected to each edge computer 6 from the individual database 31 of this entity A and fine-tunes the second general-purpose learning model on an edge basis based on the read sensor value data (step S218). If the learning model fine-tuned at step S212, S214 or S216 is present, the processing unit 21 may be configured to fine-tune this learning model.

If the processing at step S218 is completed, or if it is determined that fine tuning is not to be performed on an edge basis (step S217: NO), the processing unit 21 determines whether not fine tuning is to be performed on a machine basis with reference to the model selection information (S219). If it is determined that fine tuning is to be performed on a machine basis (step S219: YES), the processing unit 21 reads the sensor value data and the like of each molding machine 1 from the individual database 31 of this entity A and fine-tunes the second general-purpose learning model on a molding machine 1 basis based on the read sensor value data (step S220). If the learning model fine-tuned at step S212, S214, S216 or S218 is present, the processing unit 21 may be configured to fine-tune this learning model.

If the processing at step S220 is completed, or if it is determined that fine tuning is not to be performed on a machine basis (step S219: NO), the processing unit 21 determines whether or not fine tuning is to be performed on a process basis with reference to the model selection information (step S221). If it is determined that fine tuning is to be performed on a process basis (step S221: YES), the processing unit 21 reads the sensor value data and the like of the molding machine 1 obtained from the molding machine 1 having a specific machine configuration and the same process, that is, the molding machine 1 of the same type that uses the same raw material, and fine-tunes the second general-purpose learning model on a process basis based on the read sensor value data (step S222). If the learning model fine-tuned at step S212, S214, S216, S218 or S220 is present, the processing unit 21 may be configured to fine-tune the learning model.

Figure 18:
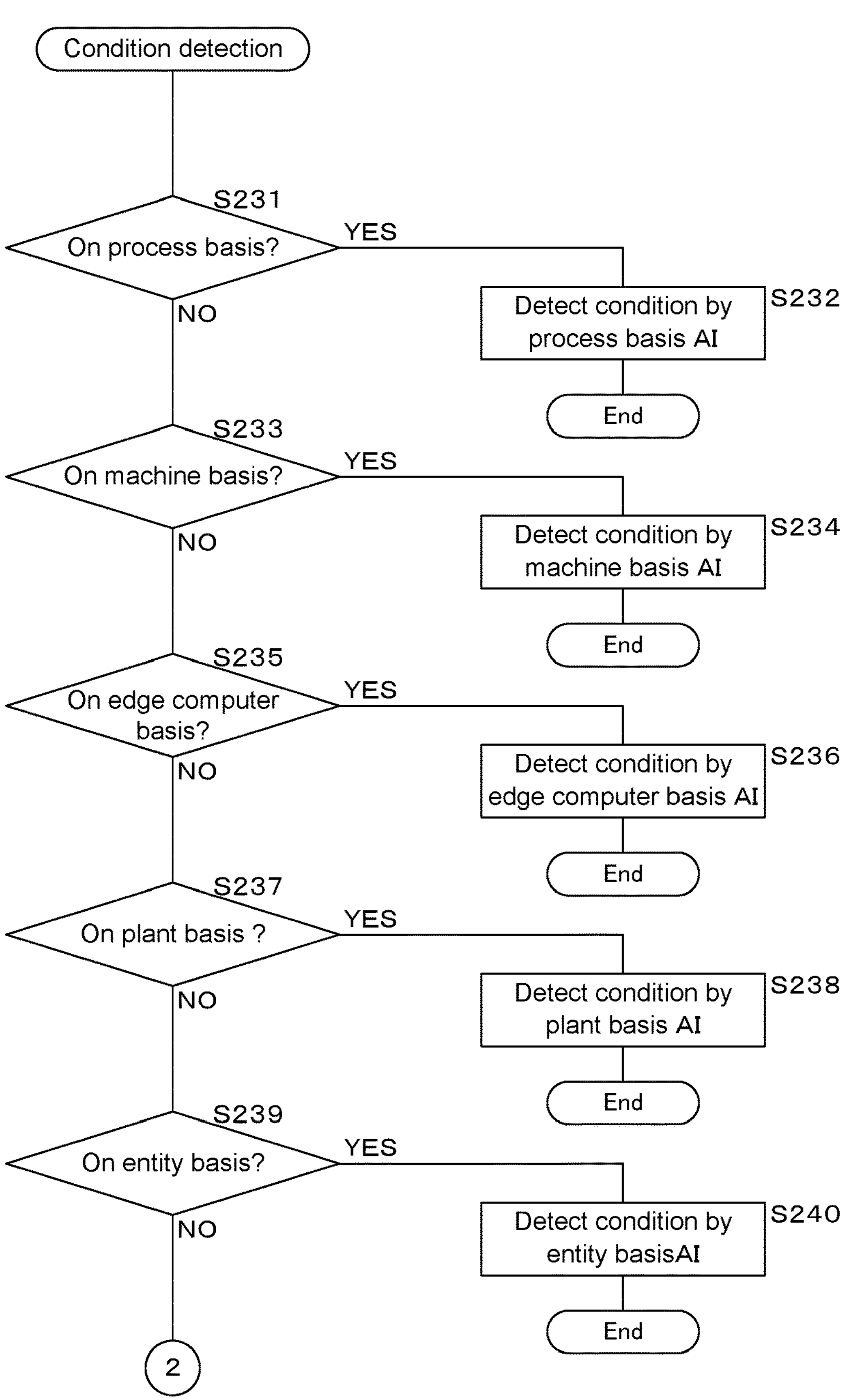
FIG. 18 is a flowchart illustrating a processing procedure related to condition detection according to the second embodiment.
Figure 19:
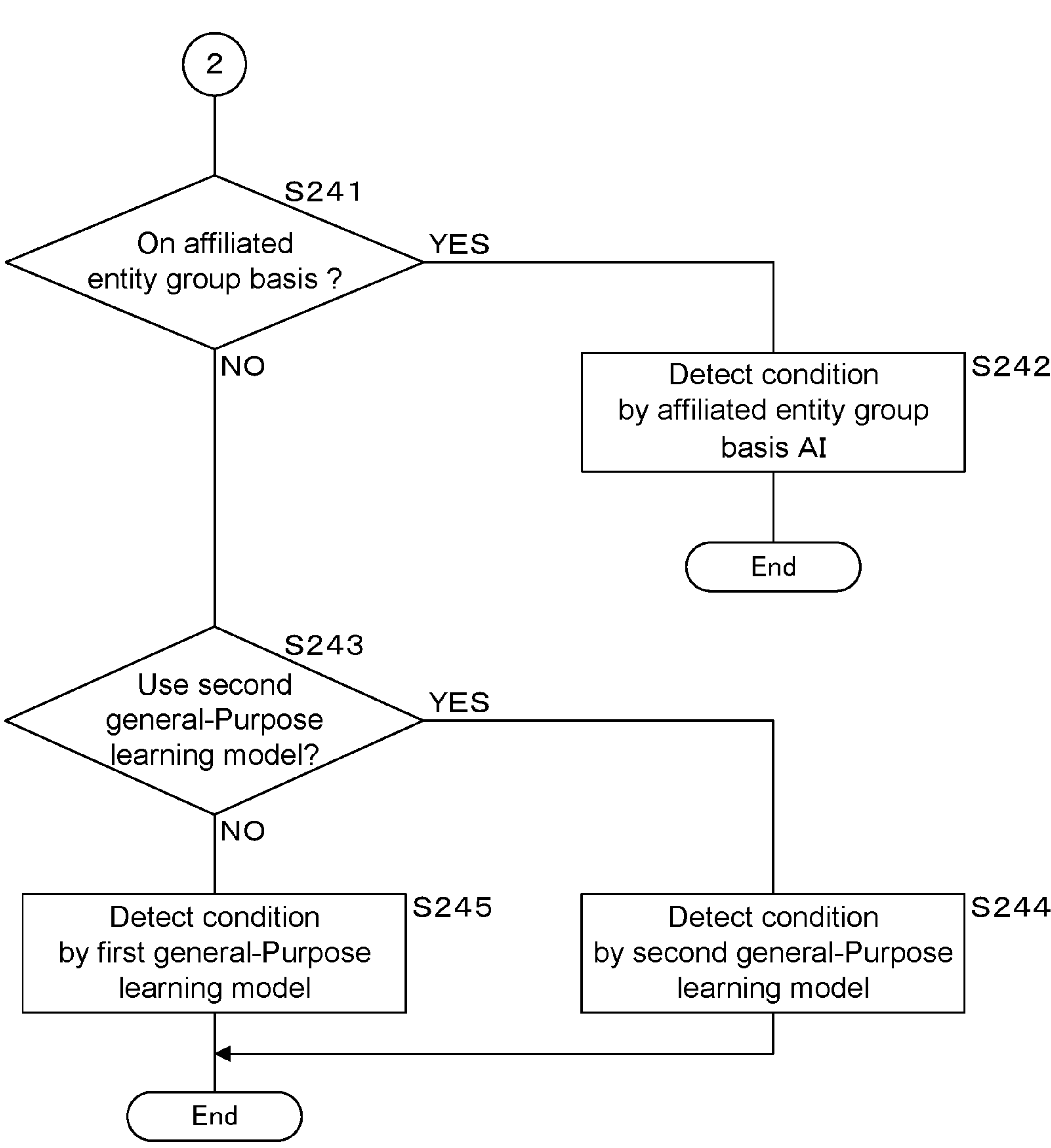
FIG. 19 is a flowchart illustrating the processing procedure related to condition detection according to the second embodiment.

FIGS. 18 and 19 are each a flowchart illustrating a processing procedure related to condition detection according to the second embodiment. The following describes the processing of detecting the condition of a single molding machine 1 using one type of learning model by the processing unit 21 of the information processing apparatus 2. This processing applies to condition detection of another molding machine 1 of another type.

The processing unit 21 of the information processing apparatus 2 determines whether or not the learning model fine-tuned on a process basis is present with reference to the model selection information (step S231). If it is determined that the learning model fine-tuned on a process basis is present (step S231: YES), the processing unit 21 detects the condition of the molding machine 1 using the learning model fine-tuned on a process basis (step S232) and ends the processing.

If it is determined that the learning model fine-tuned on a process basis is not present (step S231: NO), the processing unit 21 determines whether or not the learning model fine-tuned on a machine basis is present with reference to the model selection information (step S233). If it is determined the learning model fine-tuned on a machine basis is present (step S233: YES), the processing unit 21 detects the condition of the molding machine 1 using the learning model fine-tuned on a machine basis (step S234) and ends the processing.

If it is determined that the learning model fine-tuned on a machine basis is not present (step S233: NO), the processing unit 21 determines whether the leaning model fine-tuned on an edge basis is present with reference to the model selection information (step S235). If it is determined that the leaning model fine-tuned on an edge basis is present (step S235: YES), the processing unit 21 detects the condition of the molding machine 1 using the learning model fine-tuned on an edge basis (step S236).

If it is determined that the leaning model fine-tuned on an edge basis is not present (step S235: NO), the processing unit 21 determines whether or not the learning model fine-tuned on a plant basis is present with reference to the model selection information (step S237). If it is determined that the learning model fine-tuned on a plant basis is present (step S237: YES), the processing unit 21 detects the condition of the molding machine 1 using the learning model fine-tuned on a plant basis (step S238) and ends the processing.

If it is determined that the learning model fine-tuned on a plant basis is not present (step S237: NO), the processing unit 21 determines whether or not the learning model fine-tuned on an entity basis is present with reference to the model selection information (step S239). If it is determined that the learning model fine-tuned on an entity basis is present (step S239: YES), the processing unit 21 detects the condition of the molding machine 1 using the learning model fine-tuned on an entity basis (step S240) and ends the processing.

If it is determined that the learning model fine-tuned on an entity basis is not present (step S239: NO), the processing unit 21 determines whether or not the learning model fine-tuned on an affiliated entity group basis is present with reference to the model selection information (step S241). If it is determined that the learning model fine-tuned on an affiliated entity group basis is present (step S241: YES), the processing unit 21 detects the condition of the molding machine 1 using the learning model fine-tuned on an affiliated entity group basis (step S242) and ends the processing.

If it is determined that the learning model fine-tuned on an affiliated entity group basis is not present (step S241: NO), the processing unit 21 determines whether or not the second general-purpose learning model is to be used with reference to the model selection information (step S243). If it is determined that the second general-purpose learning model is to be used (step S243: YES), the processing unit 21 detects the condition of the molding machine 1 using the second general-purpose learning model (step S244) and ends the processing. If it is determined that the second general learning model is not to be used (step S243: NO), the processing unit 21 detects the condition of the molding machine 1 using the first general-purpose learning model (step S245) and ends the processing.

The information processing method and the like according to the second embodiment allows fine tuning of a learning model on a affiliated entity group basis, on an entity basis, on a plant basis, on an edge basis, on a machine basis and on a process basis, which enables detection of the condition of the molding machine 1 more accurately.

Each entity A can select the hierarchical level at which fine tuning is executed and can detect the condition of the molding machine 1 using the learning model fine-tuned at the desired hierarchical level.

Though the present embodiment describes an example where fine tuning of a learning model is performed by the information processing apparatus 2, the first general-purpose learning model, which is less confidential, may be proffered to the entity A to allow the edge computer 6 to detect the condition of the molding machine 1. In addition, the edge computer 6 may be configured to fine-tune the first general-purpose learning model using the sensor value data.

Third Embodiment

The information processing method, information processing apparatus 2, molding machine system and computer program P according to a third embodiment are different from those of the second embodiment in that information as an indicator for selecting an optimum learning model out of multiple learning models is proffered to the entity A. Since the other configurations of the molding machine system are similar to the molding machine system and the like in the second embodiment, the corresponding parts are designated by the same reference codes and detailed description thereof will not be made.

Figure 21:
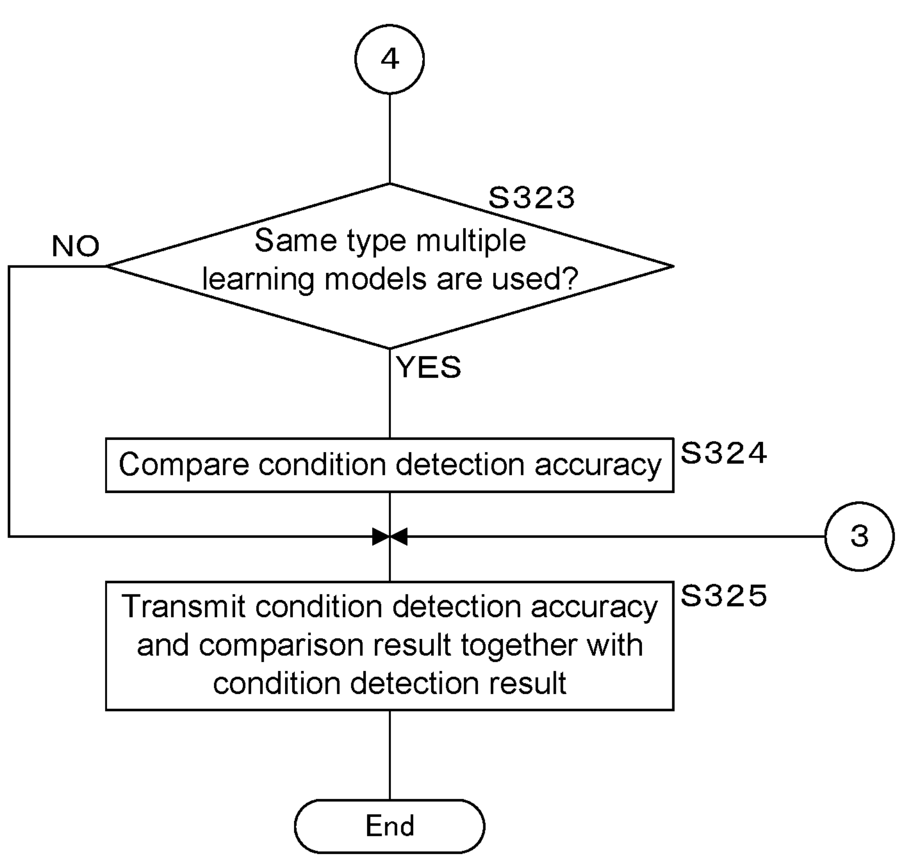
FIG. 21 is a flowchart illustrating the processing procedure for proposing an optimum learning model according to the third embodiment.

FIG. 20 and FIG. 21 are each a flowchart illustrating a processing procedure related to a proposition of an optimum learning model according to the third embodiment. The processing unit 21 of the information processing apparatus 2 receives sensor value data and the like transmitted from the edge computer 6 of a certain entity A (step S311), and stores the received sensor value data and the like in the individual database 31 (step S312). Next, the processing unit 21 selects a learning model to be used with reference to the model selection information (step S313), and inputs the sensor value data and the like to the selected learning model to detect the condition of the molding machine 1 (step S314).

Subsequently, the processing unit 21 determines whether or not the first general-purpose learning model is used (step S315). If it is determined that the first general-purpose learning model is used (step S315: YES), the processing unit 21 selects the second general-purpose learning model (step S316) and inputs the sensor value data and the like to the second general-purpose learning model to thereby detect the condition of the molding machine 1 (step S317). The processing unit 21 then compares the condition detection accuracy in using the first general-purpose learning model with the condition detection accuracy in using the second general-purpose learning model (step S318). Note that the processing unit 21 can calculate the condition detection accuracy by referring to the sensor value data and the like related to the past abnormal cases.

If it is determined that the first general-purpose learning model is not used at step S315 (step S315: NO), the processing unit 21 determines whether or not the second general-purpose learning model is used (step S319). If it is determined that the second general-purpose learning model is used (step S319: YES), the processing unit 21 selects the fine-tuned learning model (step S320) and inputs the sensor value data and the like to the fine-tuned learning model to thereby detect the condition of the molding machine 1 (step S321). In the third embodiment, even if the entity A uses only the second general-purpose learning model, the information processing apparatus 2 fine-tunes and prepares the learning model on an entity basis for the future use.

Next, the processing unit 21 compares the condition detection accuracy in using the second general-purpose learning model with the condition detection accuracy in using the fine-tuned learning model (step S322).

If it is determined that the second general-purpose learning model is not used at step S319 (step S319: NO), the processing unit 21 determines whether or not multiple learning models for detecting the same type of condition are used (step S323). In other words, the processing unit 21 determines whether or not the condition of the molding machine 1 is detected using multiple learning models that are fine-tuned at different hierarchical levels. If it is determined that the multiple learning models of the same type are used (step S323: YES), the processing unit 21 compares the condition detection accuracy between the multiple learning models (step S324). If the processing at step S318, step S322 or step S324 is completed, the processing unit 21 transmits the condition detection accuracy and the comparison result of each learning model to the control device 14 or the terminal device 8 together with the condition detection result (step S325) and ends the processing.

According to the information processing method and the like of the third embodiment, the control device 14 or the terminal device 8 receives and displays the condition detection result, the condition detection accuracy and the comparison results that are transmitted from the information processing apparatus 2. The user of each entity A can select which learning model is to be used by referring to the condition detection results and the comparison results of various learning models.

For example, the entity A using the first general-purpose learning model can confirm the improvement in detection accuracy by referring to the comparison result in the condition detection accuracy with the second learning model and can select the use of the second general-purpose learning model as necessary.

Likewise, the entity A using the second general-purpose learning model can confirm the improvement in detection accuracy by referring to the comparison result in the condition detection accuracy with the fine-tuned learning model and can select the use of fine tuning as necessary.

The entity A using learning models fine-tuned at multiple hierarchical levels can learn the condition detection result of the highest accurate and optimal learning model and can select to use this learning model.

Note that the information processing apparatus 2 may be configured to make a list of multiple learning models and their detection accuracy and provide the control device 14 or the terminal device 8 with the list.

Fourth Embodiment

The information processing method, information processing apparatus 2, molding machine system and computer program P according to the fourth embodiment are different from those of the second and third embodiments in that environment data is stored in association with the sensor value data, and a learning model is fine-tuned taking into account the environment in which the molding machine 1 is being used. Since the other configurations of the molding machine system and the like are similar to those in the second and third embodiments, the corresponding parts are designated by the same reference codes, and detailed description thereof will not be made.

FIG. 22 is a conceptual diagram illustrating an individual DB 31 according to the fourth embodiment. The molding machine system according to the fourth embodiment includes each molding machine 1, each edge computer 6 or an environment detection unit that detects a physical quantity indicating the environment of each plant. The environmental detection unit, for example, detects the ambient temperature, humidity and the like and outputs them to the edge computer 6. The edge computer 6 transmits the environmental data output from the environment detection unit to the information processing apparatus 2 along with the machine ID, the sensor value data output from the sensor 5, the molding machine control parameters and the machine configuration data.

The information processing apparatus 2 stores the sensor value data and the like and the environmental data that are transmitted from the edge computer 6 in association with each other in the individual database 31.

The information processing apparatus 2 fine-tunes a learning model on a process basis according to processing similar to that described in the second embodiment. Note that the information processing according to the fourth embodiment can optimize the second general-purpose learning model on a process basis by fine-tuning the second general-purpose learning model based on the sensor value data that are obtained from multiple molding machines 1 of the same type that use the same raw material under the same or similar environment and are stored in the individual database 31 of each entity A. The learning model fine-tuned for affiliated entity group, for entity A, for plant and for molding machine 1 connected to the edge computer 6 may further be fine-tuned by using the above-mentioned sensor value data related to a specific process.

The entity A, which is the user, can select, as a learning model for detecting the condition of the molding machine 1, the learning model fine-tuned using the sensor value data obtained from the molding machines 1 of the same type that use the same raw material under the same or similar environment, which allows detection of an abnormality of the molding machine 1 more accurately.

According to the information processing method and the like of the fourth embodiment, it is possible to fine-tune the learning model taking the surrounding environment into account.

Fifth Embodiment

The information processing method, information processing apparatus 2, molding machine system and computer program P according to a fifth embodiment are different from those of the second to fourth embodiments in the processing of displaying a condition detection result, the graph and the like. Since the other configurations of the molding machine system and the like are similar to those in the second to fourth embodiments, the corresponding parts are designated by the same reference codes and detailed description thereof will not be made.

Figure 23:
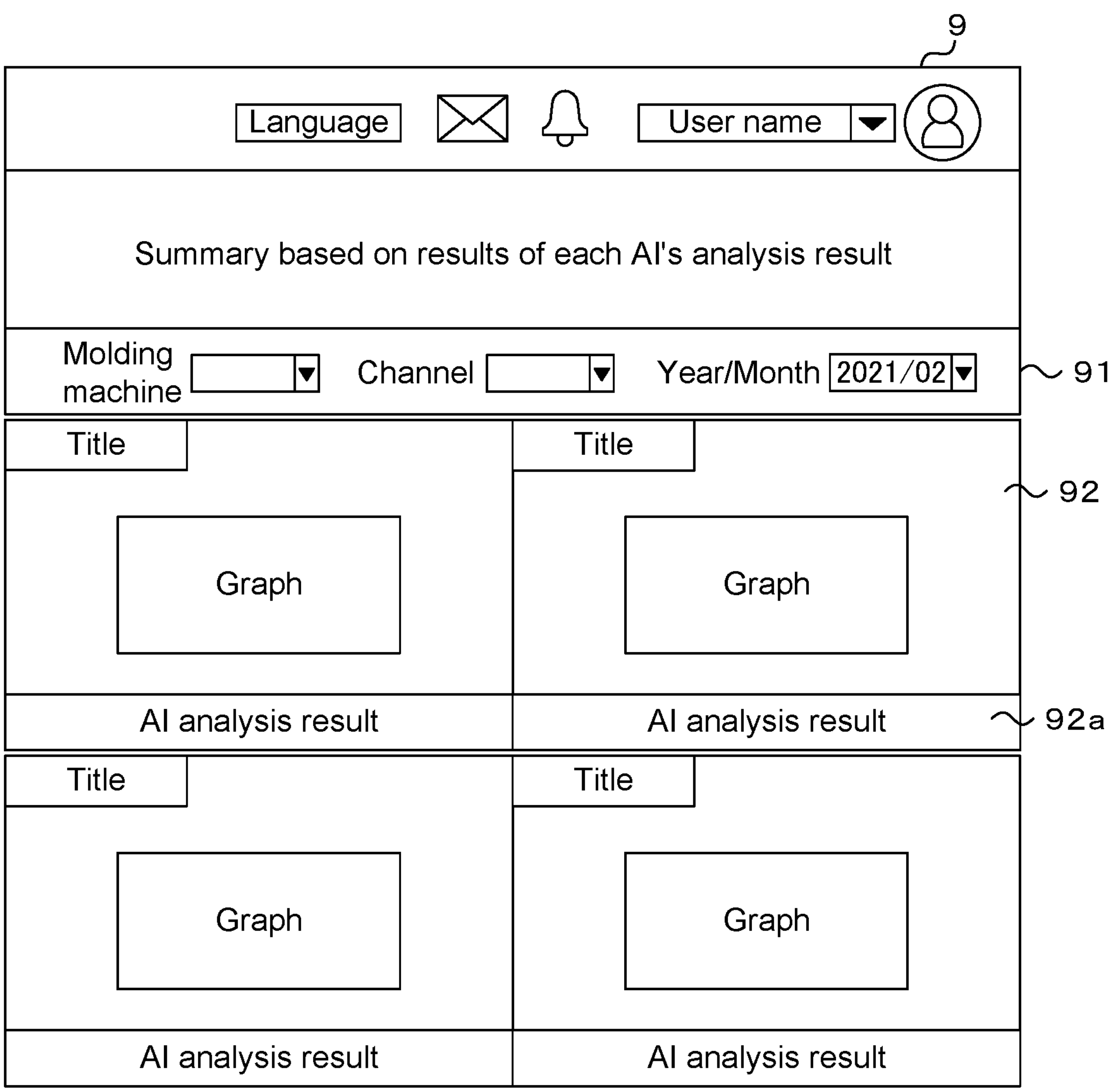
FIG. 23 is a screen example displaying a condition detection result of a molding machine according to a fifth embodiment.

FIG. 23 is a screen example displaying a condition detection result of the molding machine 1 according to the fifth embodiment. The processing unit 21 of the information processing apparatus 2 provides the control device 14 or the terminal device 8 with a condition detection result display screen 9 for display. The condition detection result display screen 9 includes a search condition input section 91 for searching the graph of sensor value data, a graph display section 92 and an analysis result display section 92*a*.

Figure 24:
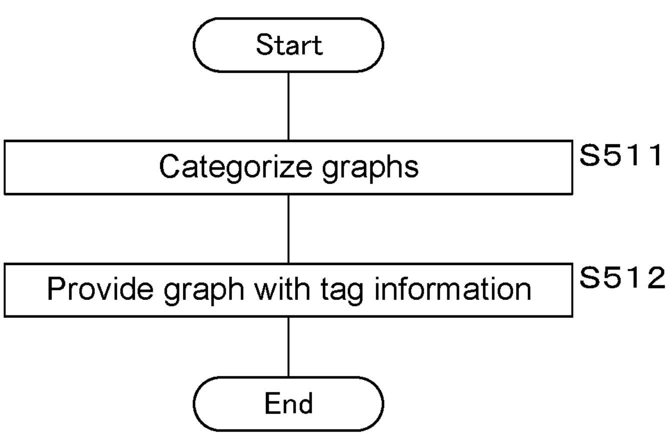
FIG. 24 is a flowchart illustrating a processing procedure related to category classification and tagging of a graph.

FIG. 24 is a flowchart illustrating a processing procedure related to categorization and tagging of a graph. The processing unit 21 of the information processing apparatus 2 categorizes graphs of various sensor value data (step S511). For example, the entity A, which is the user, can select and categorize graphs to be displayed on the condition detection result display screen 9. Furthermore, the graph of important sensor value data to be displayed on a top screen can be categorized as an important graph. The method of categorizing graphs is not limited to a particular one.

The processing unit 21 then provides each graph with tag information (step S512). For example, the name of a graph, a part of the molding machine 1 from which the sensor value data is obtained, the urgency of a condition detection result, the analysis result of a graph trend, the attention defined by the user, the browsing frequency and browsing history by the user and the preference, setting or the like of the user are provided as the tag information.

Figure 25:
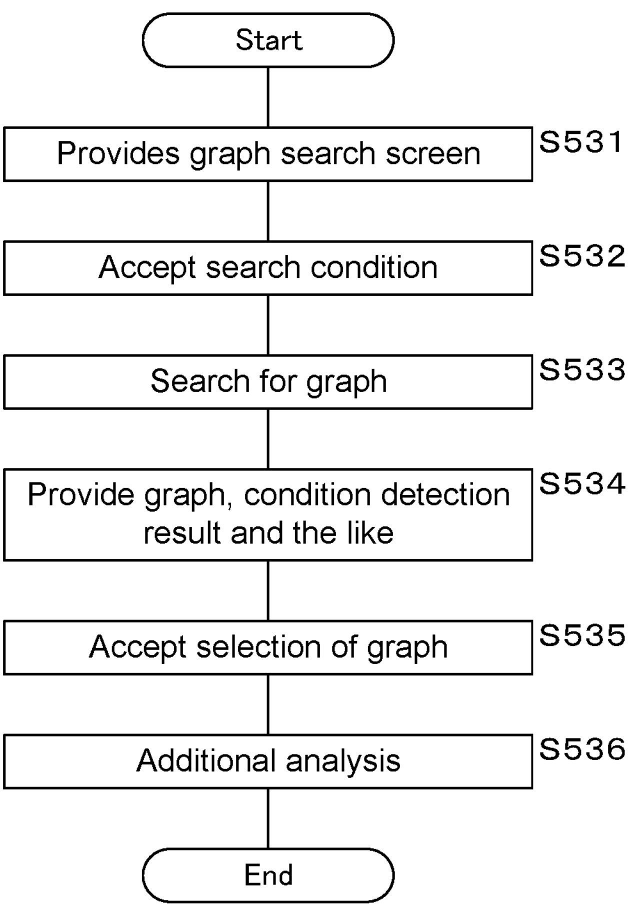
FIG. 25 is a flowchart illustrating a processing procedure for displaying a graph.

FIG. 25 is a flowchart illustrating a processing procedure for graph display. The processing unit 21 of the information processing apparatus 2 provides the control device 14 or the terminal device 8 with a graph search screen (step S531) and accepts a search condition for the graph (step S532). The processing unit 21 searches for a relevant graph with reference to the tag information of the multiple graphs based on the accepted search condition (S533). The processing unit 21 provides the control device 14 or the terminal device 8 with the graph hit by the search processing and the associated condition detection result (step S534).

Next, the processing unit 21 accepts selection of one or multiple graphs for an additional analysis (step S535) and preforms an additional analysis (step S536).

Figure 26:
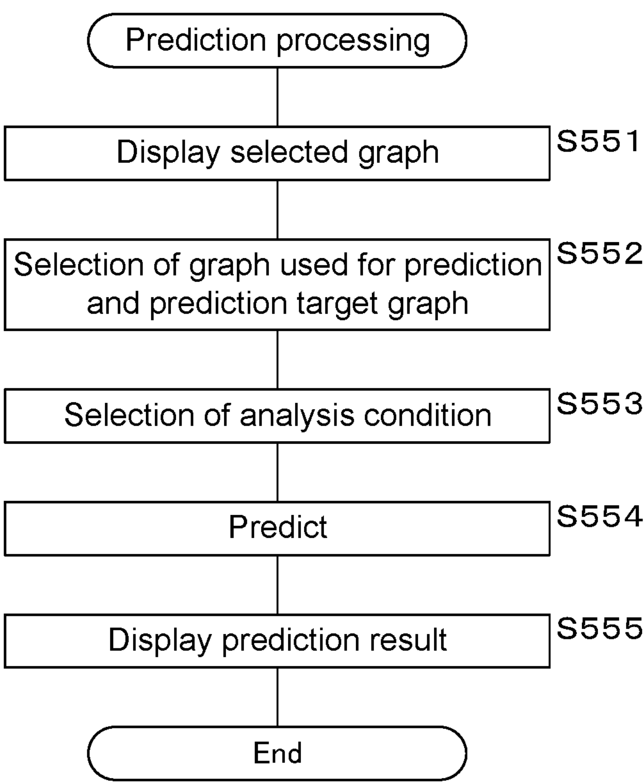
FIG. 26 is a flowchart illustrating a prediction processing procedure as one example of an additional analysis.

FIG. 26 is a flowchart illustrating a prediction processing procedure as one example of an additional analysis. In the prediction processing, the processing unit 21 causes the control device 14 or the terminal device 8 to display the selected graph (step S551) and accepts the selection of a graph used for predicting and a prediction target graph (step S552). The prediction target graph is a graph that represents sensor values desired to be predicted. The graph used for predicting is a graph containing prediction values for predicting the sensor values.

Figure 27:
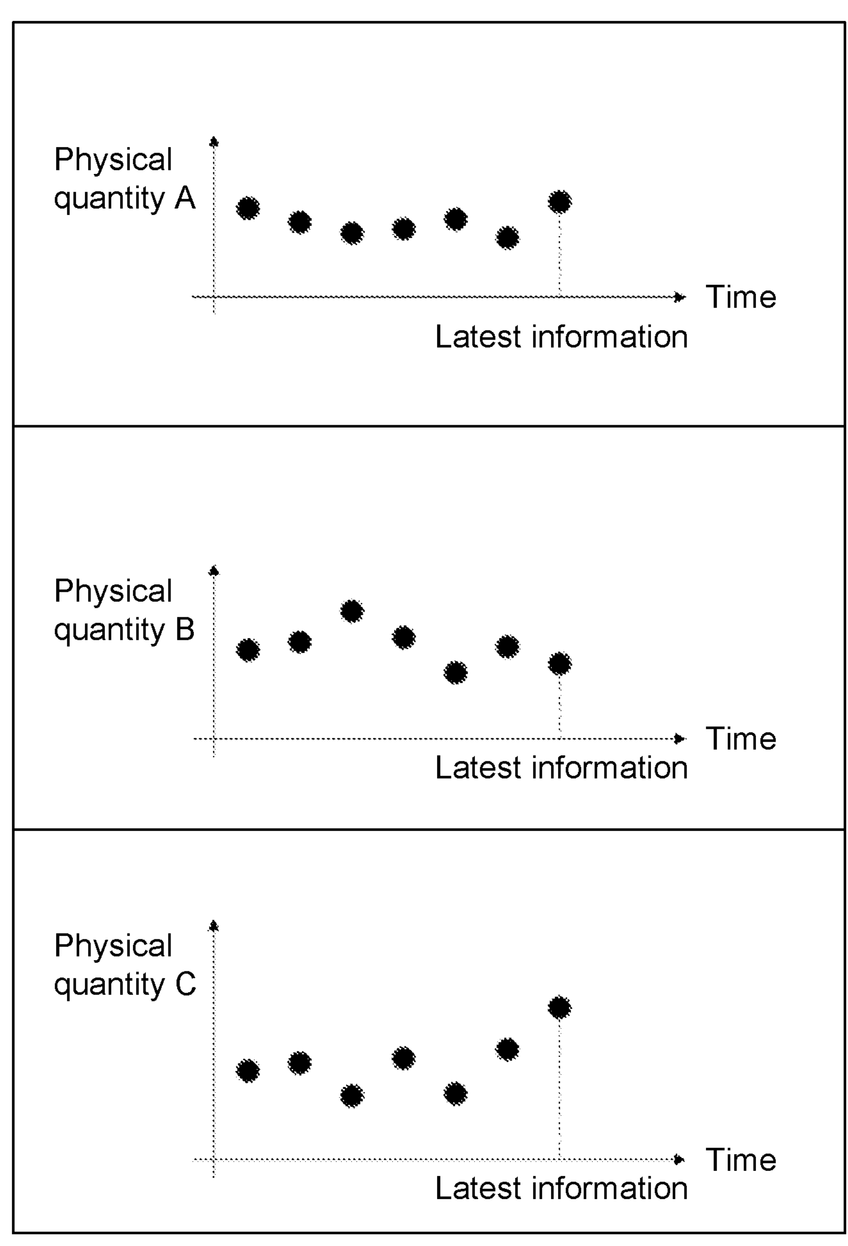
FIG. 27 is a schematic diagram illustrating selected graphs.

FIG. 27 is a schematic diagram illustrating selected graphs. The upper graph is a graph representing a time variation of the physical quantity A, the middle graph is a graph representing a time variation of the physical quantity B, and the lower graph is a graph representing a time variation of the physical quantity C.

The processing unit 21 then accepts selection of an analysis condition (step S553) and predicts the variation from the most recent physical quantity C (step S554). In other words, the subsequent value of the physical quantity C is predicated. The processing unit 21 then displays a graph containing the predicted physical quantity C on the control device 14 or the terminal device 8 (step S555).

Figure 28:
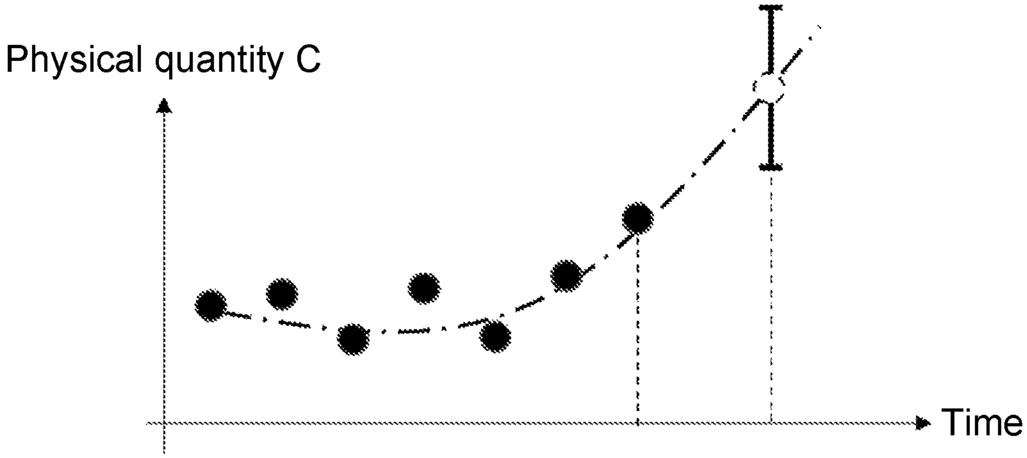
FIG. 28 is a schematic diagram illustrating a graph that presents a prediction result.

FIG. 28 is a schematic diagram illustrating a prediction result. For example, in the case where the user selects the upper graph and the middle graph as graphs used for predicting and selects the lower graph as a prediction target graph, the processing unit 21 predicts the physical quantity C to display a graph containing the physical quantity C obtained through the prediction on the control device 14 or the terminal device 8 as illustrated in FIG. 28.

Figure 29:
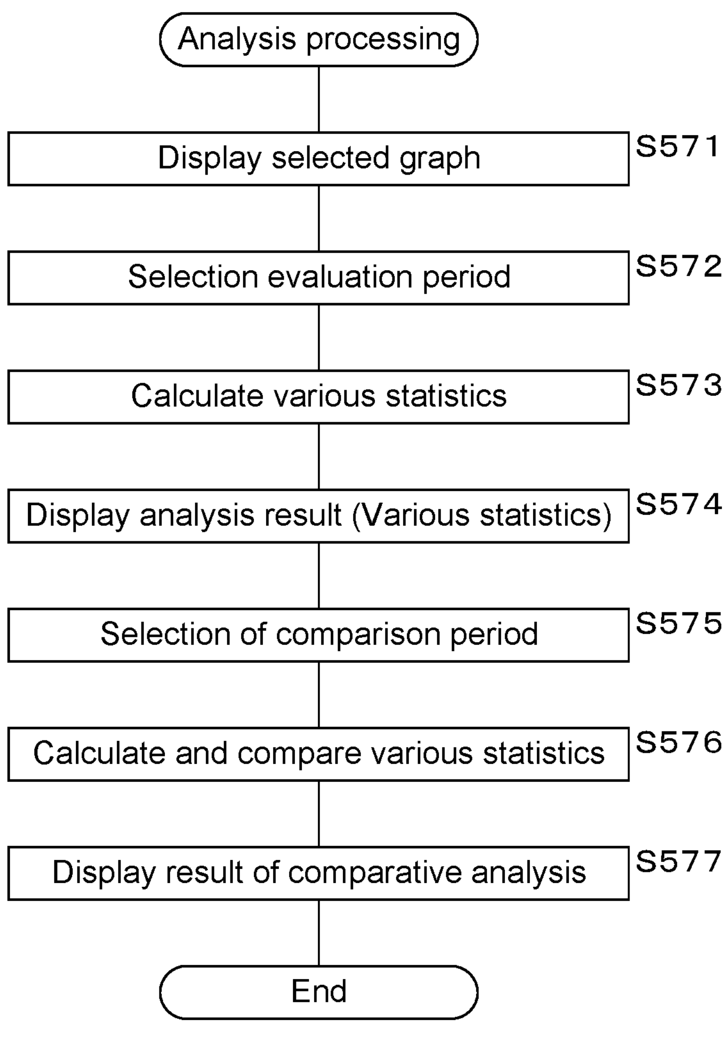
FIG. 29 is a flowchart illustrating an analysis processing procedure as one example of the additional analysis.
Figure 30:
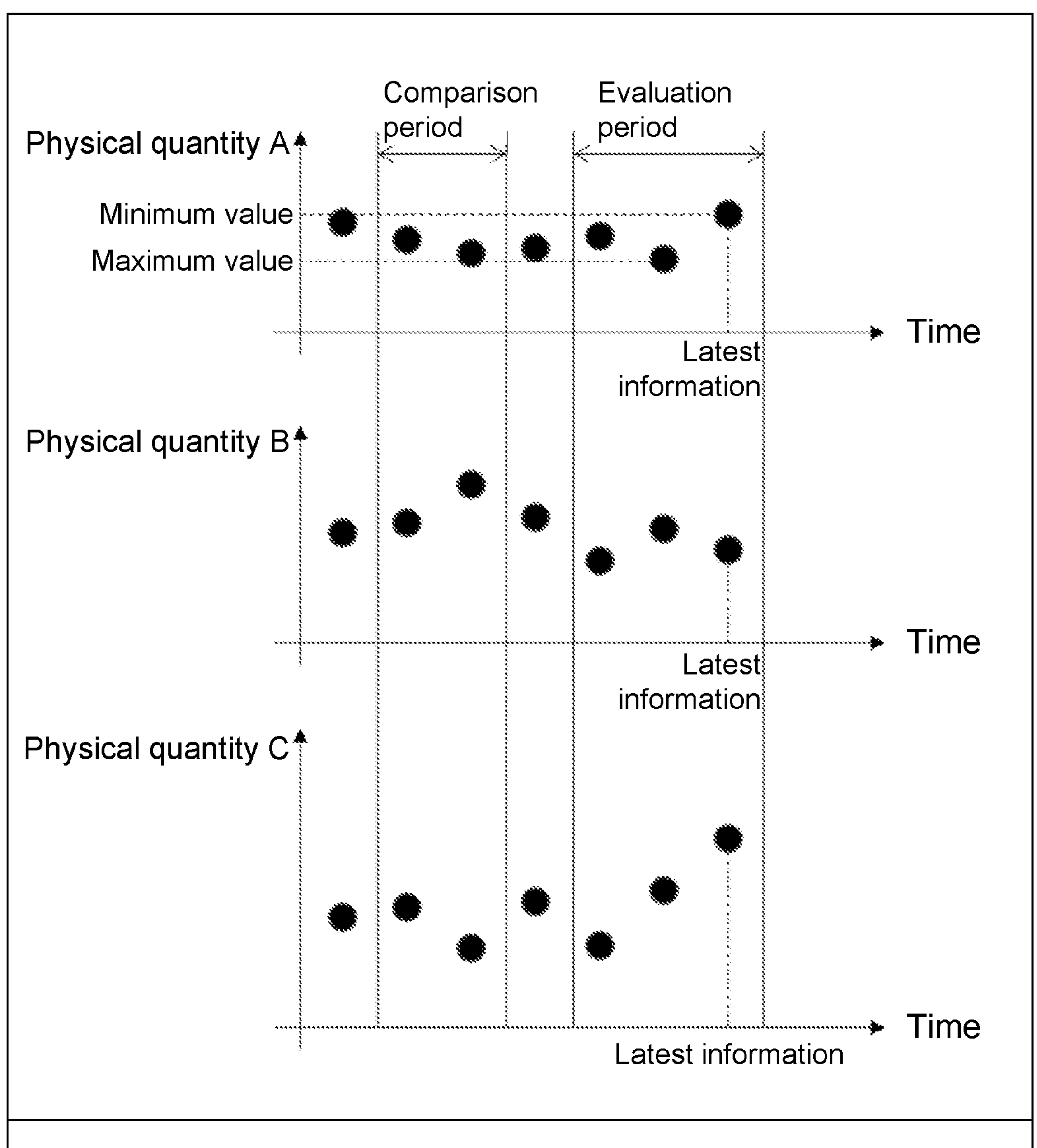
FIG. 30 is a screen example displaying an analysis result.

FIG. 29 is a flowchart illustrating an analysis processing procedure as one example of additional analysis, and FIG. 30 is a screen example displaying an analysis result. In the analysis processing, the processing unit 21 displays the selected graph on the control device 14 or the terminal device 8 (step S571) and accepts the selection during any evaluation period (step S572). The processing unit 21 calculates various statistics during the selected evaluation period (step S573). For example, the maximum value, minimum value, mean value, variance, standard deviation and the like of the physical quantities A, B, and C during the evaluation period are calculated. The processing unit 21 provides the calculated various statistics with the control device 14 or the terminal device 8 as an analysis result for display (step S574).

Subsequently, the processing unit 21 then accepts selection of a comparison period (step S575). The user can set the comparison period as necessary. In the case where the comparison period is set, the processing unit 21 calculates various statistics during the comparison period, and compares the various statistics during the evaluation period and the various statistics during the comparison period (step S576). The result of the comparative analysis is then provided to the control device 14 or the terminal device 8 for display (step S577).

According to the information processing method and the like of the fifth embodiment, graphs of various sensor values and associated condition detection results can be displayed.

Furthermore, the processing unit 21 can search and display the graph desired by the user. Moreover, the processing unit 21 can predict and display a specific physical quantity. Additionally, the processing unit 21 can display various statistics during the evaluation period arbitrarily set. In addition, the processing unit 21 can display the comparison results of various statistics calculated during the evaluation period and the comparison period that are arbitrarily set.

Though the first to fifth embodiments described the examples where the entity A such as a business corporation is the user, it may be an industry bodies, a research institution and any other organizations.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An information processing method for detecting conditions of a plurality of manufacturing devices respectively used by a plurality of entities, comprising:

acquiring sensor value data obtained by detecting physical quantities related to the plurality of manufacturing devices respectively used by the plurality of entities;

individually storing sensor value data acquired from the plurality of manufacturing devices in a plurality of databases prepared respectively for the entities that use the manufacturing devices;

generating or updating by machine learning a plurality of learning models for detecting conditions of the manufacturing devices based on sensor value data stored in the plurality of databases;

storing identifying information of the entities in association with model selection information indicating one or more of the plurality of learning models selected by the entities;

calculating a condition of a manufacturing device of one of the entities by inputting sensor value data acquired from the manufacturing device of the one of the entities to the one or more of the learning models indicated by the model selection information associated with the identifying information of the one of the entities;

fine-tuning at least one of the plurality of learning models based on sensor value data acquired from at least one of the plurality of manufacturing devices;

storing identifying information identifying the plurality of entities in association with information indicating which one of the learning models each of the entities uses between the learning model that is not fine-tuned and the fine-tuned learning model; and calculating a condition of the manufacturing device of one of the entities by inputting sensor value data acquired from the manufacturing device of the one of the entities to the learning model indicated by the information associated with the identifying information of the one of the entities.

2. The information processing method according to claim 1, wherein the manufacturing devices are each a molding machine, and the plurality of learning models include a learning model for detecting an abnormality or a degradation of a speed reducer that constitutes the molding machine, a learning model for detecting an abnormality or a degradation of a rotary shaft that constitutes the molding machine, and a learning model for detecting an abnormal or inefficient operating condition of the molding machine.

3. The information processing method according to claim 1, causing a computer to execute the processing of:

fine-tuning one of the plurality of learning models based on sensor value data acquired from the manufacturing device of the one of the entities as a learning model for the manufacturing device of the one of the entities, and calculating a condition of the manufacturing device of the one of the entities by inputting sensor value data acquired from the manufacturing device of the one of the entities to the fine-tuned learning model.

4. The information processing method according to claim 1, causing a computer to execute the processing of:

in a case where a plurality of plants that belong to the one of the entities each have the manufacturing device, fine-tuning, based on sensor value data acquired from the manufacturing device located in one of the plurality of plants, one of the learning models as a learning model for the one of the plants, and calculating a condition of the manufacturing device located in the one of the plants by inputting sensor value data acquired from the manufacturing device located in the one of the plants to the fine-tuned learning model.

5. The information processing method according to claim 1, causing a computer to execute the processing of:

in a case where a plurality of plants that belong to one of the entities each have the manufacturing device, fine-tuning, based on sensor value data acquired from the manufacturing devices respectively located in the plurality of plants, one of the learning models as a learning model shared between the plurality of plants, and calculating a condition of the manufacturing device by inputting sensor value data acquired from the manufacturing device located in any one of the plurality of plants to the fine-tuned learning model.

6. The information processing method according to claim 1 causing a computer to execute the processing of:

in a case where sensor value data is acquired via an edge computer connected to a plurality of the manufacturing devices from each of the manufacturing devices, fine-tuning, based on sensor value data of each of the manufacturing devices acquired via the edge computer, one of the learning models as a learning model shared among the plurality of the manufacturing devices connected to the edge computer, and calculating, by inputting sensor value data acquired from one of the manufacturing devices connected to the edge computer, a condition of the one of the manufacturing devices connected to the edge computer to the fine-tuned learning model.

7. The information processing method according to claim 1, causing a computer to execute the processing of:

in a case where a plurality of the manufacturing devices used by one entity are present, individually fine-tuning one of the learning models as a learning model to be used for each of the manufacturing devices based on sensor value data acquired from each of the manufacturing devices, and calculating, by inputting sensor value data acquired from one of the manufacturing devices to the fine-tuned learning model for the one of the manufacturing devices, a condition of the one of the manufacturing devices.

8. The information processing method according to claim 1, causing a computer to execute the processing of:

based on sensor value data acquired from a plurality of the manufacturing devices used by a plurality of entities constituting an affiliated entity group, fine-tuning one of the learning models as a learning model shared among the plurality of entities constituting the affiliated entity group, and calculating, by inputting sensor value data acquired from the manufacturing device used by any one of the plurality of entities constituting an affiliated entity group to the fine-tuned learning model, a condition of the manufacturing device.

9. The information processing method according to claim 1, wherein the manufacturing devices are each a molding machine, the information processing method causes a computer to execute the processing of:

fine-tuning one of the learning models based on sensor value data acquired from a plurality of the manufacturing devices of a same type that use a same material, and calculating a condition of the manufacturing device by inputting sensor value data acquired from the manufacturing device of a same type that use a same material to the fine-tuned learning model.

10. The information processing method according to claim 1, wherein the manufacturing devices are each a molding machine, and the information processing method causes a computer to execute the processing of:

fine-tuning one of the learning models based on sensor value data acquired from a plurality of the manufacturing devices of a same type that use a same material under a same or similar environment, and calculating a condition of the manufacturing device by inputting sensor value data acquired from the manufacturing devices of a same type that use a same material under a same or similar environment to the fine-tuned learning model.

11. The information processing method according to claim 1, causing a computer to execute the processing of:

in a case where a plurality of the learning models fined-tuned are present for detecting a same type of condition of the manufacturing device, calculating condition detection accuracy using each of the learning models, and presenting the condition detection accuracy calculated for each of the learning models.

12. An information processing for detecting conditions of a plurality of manufacturing devices respectively used by a plurality of entities, comprising:

acquiring sensor value data obtained by detecting physical quantities related to the plurality of manufacturing devices respectively used by the plurality of entities;

individually storing sensor value data acquired from the plurality of manufacturing devices in a plurality of databases prepared respectively for the entities that use the manufacturing devices;

generating or updating by machine learning a plurality of learning models for detecting conditions of the manufacturing devices based on sensor value data stored in the plurality of databases;

storing identifying information of the entities in association with model selection information indicating one or more of the plurality of learning models selected by the entities;

calculating a condition of a manufacturing device of one of the entities by inputting sensor value data acquired from the manufacturing device of the one of the entities to the one or more of the learning models indicated by the model selection information associated with the identifying information of the one of the entities;

storing identifying information identifying the plurality of entities in association with information indicating which one of the learning models between the learning model generated based on sensor value data stored in the plurality of databases and the learning model for detecting a condition of the manufacturing device generated based on sensor value data acquired from a manufacturing device as a testing machine or by a simulator is to be used by each of the entities, and calculating a condition of the manufacturing device of the one of the entities by inputting sensor value data acquired from the manufacturing device of the one of the entities to the learning model indicated by the information associated with the identifying information of the one of the entities.

13. The information processing method according to claim 12, causing a computer to execute the processing of:

calculating condition detection accuracy using the learning model generated based on sensor value data stored in the plurality of databases, calculating condition detection accuracy using the learning model generated for detecting a condition of a manufacturing device as a testing machine or a simulator based on sensor value data acquired from the manufacturing device, and presenting the condition detection accuracy for each of the learning models calculated.

14. An information processing apparatus for detecting conditions of a plurality of manufacturing devices respectively used by a plurality of entities, comprising:

an acquisition unit that acquires sensor value data obtained by detecting physical quantities related to the plurality of manufacturing devices respectively used by the plurality of entities;

a plurality of databases that individually store sensor value data acquired from the plurality of manufacturing devices for each of the entities that use the manufacturing devices; and a processing unit, the processing unit generating or updating by machine learning a plurality of learning models for detecting conditions of the manufacturing devices based on sensor value data stored in the plurality of databases, storing identifying information of the entities in association with model selection information indicating one or more of the plurality of the learning models selected by the entities, calculating a condition of a manufacturing device of one of the entities by inputting sensor value data acquired from the manufacturing device of the one of the entities to the one or more of the learning models indicated by the model selection information associated with the identifying information of the one of the entities;

fine-tuning at least one of the plurality of learning models based on sensor value data acquired from at least one of the plurality of manufacturing devices;

storing identifying information identifying the plurality of entities in association with information indicating which one of the learning models each of the entities uses between the learning model that is not fine-tuned and the fine-tuned learning model; and calculating a condition of the manufacturing device of one of the entities by inputting sensor value data acquired from the manufacturing device of the one of the entities to the learning model indicated by the information associated with the identifying information of the one of the entities.

15. A molding machine system, comprising:

the information processing apparatus according to claim 14; and a molding machine, wherein the information processing apparatus is configured to detect a condition of the molding machine.

16. A non-transitory computer readable recording medium storing a computer program causing a computer to execute processing of detecting a condition of a plurality of manufacturing devices respectively used by a plurality of entities, comprising:

acquiring sensor value data obtained by detecting physical quantities related to the plurality of manufacturing devices respectively used by the plurality of entities;

individually storing sensor value data acquired from the plurality of manufacturing devices in a plurality of databases prepared respectively for the entities that use the manufacturing devices;

generating or updating by machine learning a plurality of learning models for detecting conditions of the manufacturing devices based on sensor value data stored in the plurality of databases;

storing identifying information of the entities in association with model selection information indicating one or more of the plurality of learning models selected by the entities;

calculating a condition of a manufacturing device of one of the entities by inputting sensor value data acquired from the manufacturing device of the one of the entities to the one or more of the learning models indicated by the model selection information associated with the identifying information of the one of the entities;

fine-tuning at least one of the plurality of learning models based on sensor value data acquired from at least one of the plurality of manufacturing devices;

storing identifying information identifying the plurality of entities in association with information indicating which one of the learning models each of the entities uses between the learning model that is not fine-tuned and the fine-tuned learning model; and calculating a condition of the manufacturing device of one of the entities by inputting sensor value data acquired from the manufacturing device of the one of the entities to the learning model indicated by the information associated with the identifying information of the one of the entities.

17. An information processing apparatus for detecting conditions of a plurality of manufacturing devices respectively used by a plurality of entities, comprising:

an acquisition unit that acquires sensor value data obtained by detecting physical quantities related to the plurality of manufacturing devices respectively used by the plurality of entities;

a plurality of databases that individually store sensor value data acquired from the plurality of manufacturing devices for each of the entities that use the manufacturing devices; and a processing unit, the processing unit generating or updating by machine learning a plurality of learning models for detecting conditions of the manufacturing devices based on sensor value data stored in the plurality of databases, storing identifying information of the entities in association with model selection information indicating one or more of the plurality of the learning models selected by the entities, calculating a condition of a manufacturing device of one of the entities by inputting sensor value data acquired from the manufacturing device of the one of the entities to the one or more of the learning models indicated by the model selection information associated with the identifying information of the one of the entities, storing identifying information identifying the plurality of entities in association with information indicating which one of the learning models between the learning model generated based on sensor value data stored in the plurality of databases and the learning model for detecting a condition of the manufacturing device generated based on sensor value data acquired from a manufacturing device as a testing machine or by a simulator is to be used by each of the entities, and calculating a condition of the manufacturing device of the one of the entities by inputting sensor value data acquired from the manufacturing device of the one of the entities to the learning model indicated by the information associated with the identifying information of the one of the entities.

18. A non-transitory computer readable recording medium storing a computer program causing a computer to execute processing of detecting a condition of a plurality of manufacturing devices respectively used by a plurality of entities, comprising:

acquiring sensor value data obtained by detecting physical quantities related to the plurality of manufacturing devices respectively used by the plurality of entities;

individually storing sensor value data acquired from the plurality of manufacturing devices in a plurality of databases prepared respectively for the entities that use the manufacturing devices;

generating or updating by machine learning a plurality of learning models for detecting conditions of the manufacturing devices based on sensor value data stored in the plurality of databases;

storing identifying information of the entities in association with model selection information indicating one or more of the plurality of learning models selected by the entities;

calculating a condition of a manufacturing device of one of the entities by inputting sensor value data acquired from the manufacturing device of the one of the entities to the one or more of the learning models indicated by the model selection information associated with the identifying information of the one of the entities;

storing identifying information identifying the plurality of entities in association with information indicating which one of the learning models between the learning model generated based on sensor value data stored in the plurality of databases and the learning model for detecting a condition of the manufacturing device generated based on sensor value data acquired from a manufacturing device as a testing machine or by a simulator is to be used by each of the entities; and calculating a condition of the manufacturing device of the one of the entities by inputting sensor value data acquired from the manufacturing device of the one of the entities to the learning model indicated by the information associated with the identifying information of the one of the entities.

* * * * *